(12) United States Patent
Musa

(10) Patent No.: US 8,283,410 B2
(45) Date of Patent: Oct. 9, 2012

(54) RING-OPENING METATHESIS POLYMERIZATION OF NORBORNENE AND OXANORBORNENE MOIETIES AND USES THEREOF

(75) Inventor: Osama M. Musa, Hillsborough, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 12/887,795

(22) Filed: Sep. 22, 2010

(65) Prior Publication Data

US 2011/0065880 A1 Mar. 17, 2011

Related U.S. Application Data

(60) Provisional application No. 61/245,681, filed on Sep. 25, 2009.

(51) Int. Cl.
*C08G 61/12* (2006.01)
*C08F 8/04* (2006.01)
*C08F 4/80* (2006.01)

(52) U.S. Cl. ............... 524/549; 524/548; 525/327.2; 525/327.4; 525/338; 525/940; 526/268; 526/271

(58) Field of Classification Search ............... 526/268, 526/271; 525/327.2, 327.4, 338, 940; 524/548, 524/549

See application file for complete search history.

(56) References Cited

U.S. PATENT DOCUMENTS

| | | | |
|---|---|---|---|
| 4,883,851 A | | 11/1989 | Grubbs et al. |
| 4,945,144 A | * | 7/1990 | Grubbs et al. ............... 526/268 |
| 5,840,820 A | * | 11/1998 | DeSimone et al. ............ 528/34 |
| 6,281,307 B1 | | 8/2001 | Muhlebach et al. |
| 7,081,501 B2 | * | 7/2006 | Okawa et al. ............. 525/327.2 |
| 2009/0208873 A1 | | 8/2009 | Harada et al. |

OTHER PUBLICATIONS

Buchmeiser et al, "ROMP-Based, Highly Hydrophilic Poly(7-oxanorborn-2-ene-5,6-dicarboxylic acid)-Coated Silica . . . ", Chem. Mater. 1999, 11, 1533-1540.*
Lu et al, "Aqueous ring-opening metathesis polymerisation of 7-oxanorbornene derivatives with oxygen-containing functionalities", Macromol. Chem. Phys. 195, 1273-1288 (1994).*
Zenkl, et al, "The aqueous ring-opening metathesis polymerization of 7-oxa-norbornene-2,3-dicarboxylic acid methyl ester and norbornene with Ru catalysts," J. of Molecular Catalysis, 76 (1992) 1-14.*
International Search Report for PCT/US10/49908 filed on Sep. 23, 2010.

* cited by examiner

*Primary Examiner* — Fred M Teskin
(74) *Attorney, Agent, or Firm* — William J. Davis; Richard R. Muccino

(57) ABSTRACT

The present invention provides homopolymers resulting from ROMP of oxanorbornene dicarboxylic anhydride moieties and non-homopolymers resulting from ROMP of norbornene dicarboxylic anhydrides and oxanorbornene dicarboxylic anhydrides with co-monomer moieties. The invention further provides hydrogenated homopolymers resulting from ROMP of oxanorbornene dicarboxylic anhydrides and hydrogenated non-homopolymers resulting from ROMP of norbornene dicarboxylic anhydrides and oxanorbornene dicarboxylic anhydrides with co-monomer moieties. The invention further provides a wide variety of compositions comprising the novel ROMP moieties. Some of the novel ROMP moiety structures are set out below, wherein $R_1$, $R_2$, X, n, and m are defined herein.

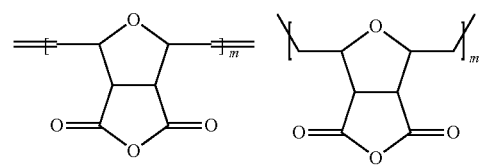

16 Claims, No Drawings

RING-OPENING METATHESIS POLYMERIZATION OF NORBORNENE AND OXANORBORNENE MOIETIES AND USES THEREOF

BACKGROUND OF THE INVENTION

1. Field of the Invention

The present invention provides homopolymers resulting from ROMP of oxanorbornene dicarboxylic anhydride moieties and non-homopolymers resulting from ROMP of norbornene dicarboxylic anhydrides and oxanorbornene dicarboxylic anhydrides with co-monomer moieties. The invention further provides hydrogenated homopolymers resulting from ROMP of oxanorbornene dicarboxylic anhydrides and hydrogenated non-homopolymers resulting from ROMP of norbornene dicarboxylic anhydrides and oxanorbornene dicarboxylic anhydrides with co-monomer moieties. The invention further provides a wide variety of compositions comprising the novel ROMP moieties.

2. Description of Related Art

Well-defined ruthenium initiators, have been shown to display excellent functional group tolerance in Ring-Opening Metathesis Polymerization (ROMP) and provide the syntheses of well-defined polymers with controlled architectures, molecular weights, polydispersities, and terminal functionalities.

Because of the relative simplicity of their synthesis and valuable properties, oxanorbornene moieties (7-oxanorbornenes, 7-oxabicyclo[2.2.1]heptenes) have great potential in materials sciences. Oxanorbornenes, and their synthetic analogues, have significant biological activities and play a major role in drug-delivery studies and biological, medical, and clinical analyses. Oxanorbornenes can be prepared by Diels-Alder cycloadditions of furans, as well as other methods, that involve cationic or radical intermediates. Diels-Alder cycloadditions remain the most general and simple approach to obtaining oxanorbornene moieties.

Oxanorbornenes undergo a variety of reactions making them useful synthetic intermediates for the preparation of thermosetting materials and natural products. Oxanorbornenes are highly strained bicyclic structures that undergo ROMP yielding unsaturated polymers. ROMP poly(oxanorbornenes) have a wide range of useful properties. Homopolymers and non-homopolymers of oxanorbornenes have potential applications as adhesives, coatings, encapsulations, personal care formulations, oilfield formulations, membrane formulations, agricultural, or cleaning composition detergents, lubricant additives, additives for water treatment, elastomers, and the like.

Well-defined initiators for ROMP allow the control of many aspects of the polymerization process, including cis/trans vinylene content and tacticity as well as macromolecular parameters such as molecular weight and molecular weight distribution. Many ROMP initiators are tolerant towards polar functional groups (aldehydes, acids, alcohols) and aqueous environments, which provide polymers having a wide range of novel functional materials, such as water-soluble polymers, polar polymers and biocompatible materials. Also polymerizations in the presence of most of well defined Ru- and Mo-based initiators proceeds in the absence of termination steps.

Disclosures discussing ROMP include UK Pat. Appl. GB 2,238,791; WO 2009/039407; Hamilton et al., *J. Mol. Catal., A: Chemical* 133 (1998) 83; Sadeghi-Khomami et al. *Org. Lett. Vol.* 7, no. 22, 4891 (2005); France et al., *J. Chem. Ed.* (1999) 76, 659; Kapellen et al., *Polymer Bulletin*, (1994), 32, 3; Stumpf et al., *J. Chem. Soc., Commun.* (1995) 1127; France et al., *J. Chem. Ed.* (1999) 76, 661; Gatschelhofer et al., *J. Chromatogr.*, A 1216 (2009) 2651; Qu et al., *Polymer* 50 (2009) 391; Stockmann, *J. Org. Chem.* 26, 2025 (1961); Katayama et al., *Organomet. Chem.* 600 (2000) 16; Hamilton et al., *J. Chem. Soc., Commun.* (1990) 119; Burtscher et al., *J. Polymer Sci. Part A: Polym. Chem.* 46 (2008) 4630; Katayama et al., *Chemistry Letters* (1998) 67; Lienkamp et al., *J. Polymer Sci. Part A: Polym. Chem.* 47 (2009) 1266; Vogel et al., *Tetrahedron* 55 (1999) 13521; Katayama et al., *Organometallics* (2003) 22, 586; Ami-Ebrahimi et al., *Macromolecules* (2000) 33, 717; Clayerie et al., *Prog. Palm. Sci.* 28 (2003) 619; and Samanta et al., *Macromolecules* (2008) 41, 530.

SUMMARY OF THE INVENTION

The present invention provides homopolymers resulting from ring-opening metathesis polymerization of an oxanorbornene dicarboxylic anhydride moiety. In one embodiment, the homopolymer is represented by the structure:

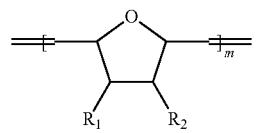

wherein $R_1$ and $R_2$ are independently selected from the group consisting of carboxylic acids, carboxylic acid salts, esters, and wherein $R_1$ and $R_2$ may be bonded together to form an anhydride ring moiety, and mixtures thereof; with the proviso that $R_1$ and $R_2$ are not both esters or are not both a carboxylic acid and a carboxylic ester, at the same time; and m is an integer ranging from about 2 to about 10,000.

The present invention also provides non-homopolymers resulting from ring-opening metathesis polymerization of a norbornene dicarboxylic anhydride or oxanorbornene dicarboxylic anhydride moiety with a co-monomer moiety, wherein the non-homopolymer may be blocked or random, and the ratio of blocked or random norbornene dicarboxylic anhydride or oxanorbornene dicarboxylic anhydride moiety to co-monomer moiety is from about 99:1 to about 1:99, respectively. In one embodiment, the non-homopolymer is represented by the structure:

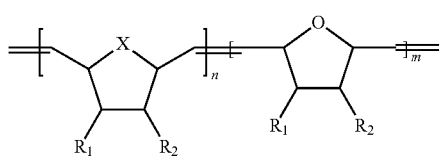

wherein X is selected from group consisting of $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; with the proviso that $R_1$ and $R_2$ are not both esters or are not both a carboxylic acid and a carboxylic ester, at the same time; and n and m are integers independently ranging from about 2 to about 10,000.

In another embodiment, the present invention further provides non-homopolymers represented by the structure:

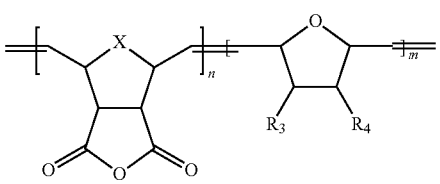

wherein X is selected from group consisting of $CH_2$ and O; $R_3$ and $R_4$ are independently selected from the group consisting of carboxylic acids, carboxylic acid salts, esters, branched and unbranched $C_1$-$C_6$alkyl groups, which may be with or without heteroatoms, and wherein $R_3$ and $R_4$ may be bonded together to form an anhydride ring moiety, and mixtures thereof; and n and m are integers independently ranging from about 2 to about 10,000.

The present invention still further provides hydrogenated homopolymers resulting from ring-opening metathesis polymerization of an oxanorbornene dicarboxylic anhydride moiety. In one embodiment, the hydrogenated homopolymer is represented by the structure

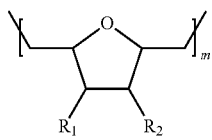

wherein $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; and m is an integer ranging from about 2 to about 10,000.

The present invention yet further provides hydrogenated non-homopolymers resulting from ring-opening metathesis polymerization of a norbornene dicarboxylic anhydride or oxanorbornene dicarboxylic anhydride moiety with a co-monomer moiety, wherein the non-homopolymer may be blocked or random, and the ratio of blocked or random norbornene dicarboxylic anhydride or oxanorbornene dicarboxylic anhydride moiety to co-monomer moiety is from about 99:1 to about 1:99, respectively. In one embodiment, the hydrogenated non-homopolymer is represented by the structure:

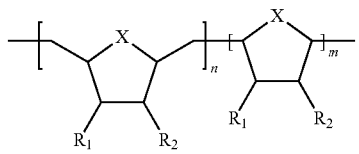

wherein X is a group independently selected from $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; and n and m are integers independently ranging from about 2 to about 10,000.

The present invention further provides a wide variety of compositions comprising the above homopolymers, non-homopolymers, hydrogenated homopolymers, and hydrogenated non-homopolymers.

DESCRIPTION OF PREFERRED EMBODIMENTS OF THE INVENTION

The present invention provides homopolymers resulting from ROMP of oxanorbornene dicarboxylic anhydride moieties and non-homopolymers resulting from ROMP of norbornene dicarboxylic anhydrides and oxanorbornene dicarboxylic anhydrides with co-monomer moieties. The invention further provides hydrogenated homopolymers resulting from ROMP of oxanorbornene dicarboxylic anhydrides and hydrogenated non-homopolymers resulting from ROMP of norbornene dicarboxylic anhydrides and oxanorbornene dicarboxylic anhydrides with co-monomer moieties. The above non-homopolymers may be blocked or random, and the ratio of blocked or random moieties may be from about 99:1 to about 1:99. The invention further provides a wide variety of compositions comprising the novel ROMP moieties including adhesive, coating, encapsulation, personal care, oilfield, membrane, agricultural, and cleaning compositions.

The ROMP moieties were prepared using the commercially available first-generation Grubbs ruthenium catalyst (phenylmethylene bis(tricyclohexylphosphine) ruthenium dichloride), the second-generation Grubbs ruthenium catalyst (1,3-bis-(2,4,6-trimethylphenyl)-2-(imidazolidinylidene)-(dichlorophenylmethylene) (tricyclohexylphosphine) ruthenium, and the Umicore initiator (dichloro-(3-phenyl-1H-inden-1-ylidene)-bis(tricyclohexylphosphine) ruthenium(II)). The ROMP moieties may also be prepared using Hoveyda-Grubbs; molybdenum (Mo) and tungsten (W) based initiators known as Schrock and Schrock-Hoveyda; and other transition metal initiators both well defined and not so well defined.

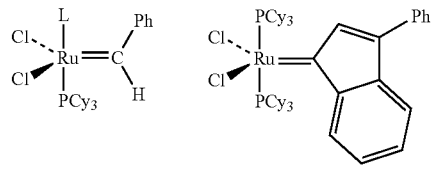

Grubbs Initiators
L = PCy3, first-generation
L = IMes, second-generation

Umicore Initiator

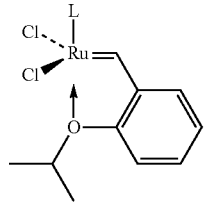

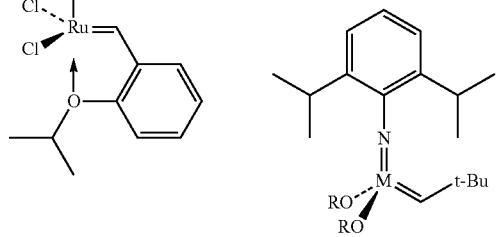

Hoveyda-Grubbs Initiators
L = PCy3, first-generation
L = IMes, second-generation Schrock and Schrock-Hoveyda Initiators
M = Mo and/or W As used herein, the following terms have the meanings set out below.

The term "are each independently selected from the group consisting of," means that when a group appears more than once in a structure, that group may be independently selected each time it appears. For example, in the structure below:

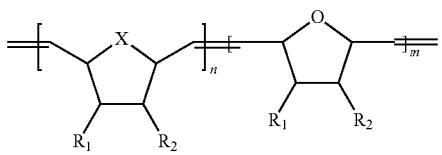

$R_1$ and $R_2$ each appear twice. The term "are each independently selected from the group consisting of:" means that each $R_1$ group may be the same or different and that each $R_2$ group may be the same or different.

The term "branched and unbranched alkyl groups" refers to alkyl groups, which may be straight chained or branched. Preferably, the alkyl groups have from 1 to 6 carbon atoms. Branched groups include isopropyl, tert-butyl, and the like.

The term "co-monomer" refers to a polymerizable reactant moiety different from the monomer moieties of the invention (different polymerizable reactant moiety) so that when the two are reacted, non-homopolymers are obtained. The co-monomer is a norbornene and/or an oxanorbornene moiety. Non-limiting illustrative examples of co-monomers are set out in the examples.

The term "compound comprising a norbornene or an oxanorbornene moiety" employs the term "comprising" which is an "open ended term" that means that the claim encompasses all of the elements listed as well as additional, unnamed elements, such as a compound containing both a norbornene and an oxanorbornene functionality.

The term "heteroatom" refers to atoms such as oxygen, nitrogen, sulfur, and phosphorous.

The term "homopolymer" refers to a polymer formed from a single monomer.

The term "norbornene" refers to compounds having the general structure:

The term "monomer" refers to the repeat units comprising a polymer. A monomer is a small molecule that can chemically bonds to itself and/or other monomers to form a polymer.

The term "non-homopolymer" refers to a polymer formed from two or more different monomers and includes essentially all polymers that are not homopolymers. Nonlimiting examples of non-homopolymers include copolymers, terpolymers, tetramers, and the like, wherein the non-homopolymer is a random, blocked, or alternating polymer.

The term "oxanorbornene" refers to compounds having the general structure:

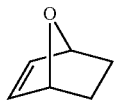

The term "oxanorbornene dicarboxylic anhydride moiety" refers to compounds having the general structure:

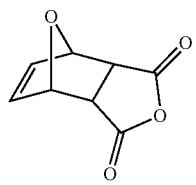

The term "polymer" refers to a large molecule (macromolecule) composed of repeating structural units (monomers) connected by covalent chemical bonds.

The term "ROMP" refers to "ring-opening metathesis polymerization" which is an adaptation of olefin metathesis, where cyclic olefins are polymerized using transition metal complexes as initiators. Cyclic olefins are usually reacted with linear olefins to generate acyclic dienes. The reaction makes use of strained ring systems, such as norbornene and oxanorbornenes, and their derivatives to produce an array of stereoregular and monodisperse polymers and copolymers.

The present invention provides homopolymers resulting from ring-opening metathesis polymerization of oxanorbornene dicarboxylic anhydride moieties. The homopolymers may be represented by the structure:

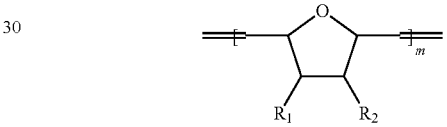

wherein $R_1$ and $R_2$ are independently selected from the group consisting of carboxylic acids, carboxylic acid salts, esters, and wherein $R_1$ and $R_2$ may be bonded together to form an anhydride ring moiety, and mixtures thereof; with the proviso that $R_1$ and $R_2$ are not both esters or are not both a carboxylic acid and a carboxylic ester, at the same time; and m is an integer ranging from about 2 to about 10,000.

Preferably, $R_1$ and $R_2$ are independently selected from the group consisting of carboxylic acids, carboxylic acid salts, and wherein $R_1$ and $R_2$ may be bonded together to form an anhydride ring moiety, and mixtures thereof. More preferably, $R_1$ and $R_2$ may be bonded together to form an anhydride ring moiety. Preferably m is an integer ranging from about 2 to about 5,000, more preferably, from about 2 to about 1,000, and most preferably, from about 2 to about 500.

Preferred homopolymers are set out below:

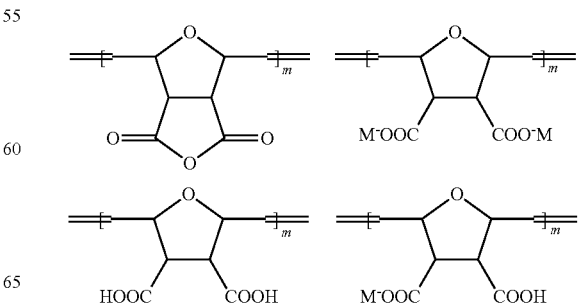

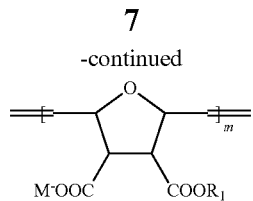

wherein R₁ is defined above; and each M is independently selected from the group consisting of monovalent and divalent metal ions.

Preferably, M is an alkali metal or an alkaline earth metal. The alkali metals comprise lithium, sodium, potassium, rubidium, caesium, and francium; preferably the alkali metal is lithium, sodium, or potassium. The alkaline earth metals comprise beryllium, magnesium, calcium, strontium, barium, and radium, preferably the alkaline earth metal is magnesium or calcium.

More preferred homopolymers are set out below:

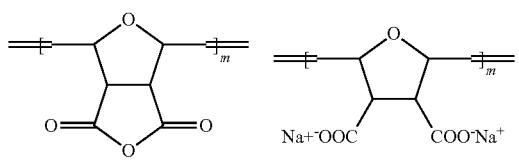

The most preferred homopolymer is set out below:

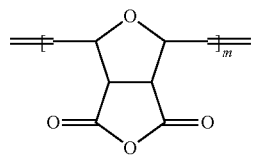

The present invention provides compositions comprising a homopolymer resulting from ring-opening metathesis polymerization of an oxanorbornene dicarboxylic anhydride moiety. The compositions comprising the novel ROMP moieties included adhesive, coating, encapsulation, personal care, oilfield, membrane, agricultural, and cleaning compositions. The homopolymer in the compositions may be represented by the structure:

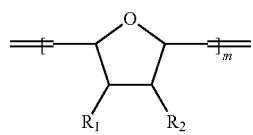

wherein R₁ and R₂ are independently selected from the group consisting of carboxylic acids, carboxylic acid salts, esters, and wherein R₁ and R₂ may be bonded together to form an anhydride ring moiety, and mixtures thereof; and m is an integer ranging from about 2 to about 10,000.

Preferred homopolymers in the compositions are set out below:

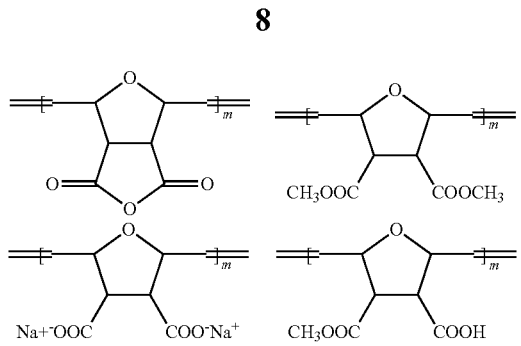

More preferred homopolymers in the compositions are set out below:

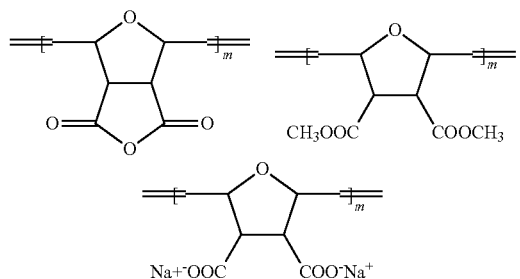

The present invention also provides non-homopolymers resulting from ring-opening metathesis polymerization of a norbornene dicarboxylic anhydride or oxanorbornene dicarboxylic anhydride moiety with a co-monomer moiety, wherein the non-homopolymer may be blocked or random, and the ratio of blocked or random norbornene dicarboxylic anhydride or oxanorbornene dicarboxylic anhydride moiety to co-monomer moiety is from about 99:1 to about 1:99, respectively. The non-homopolymers may be represented by the structure:

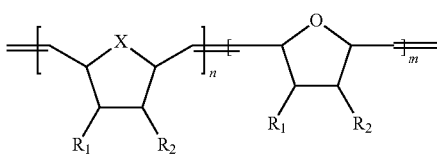

wherein X is selected from group consisting of $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; with the proviso that $R_1$ and $R_2$ are not both esters or are not both a carboxylic acid and a carboxylic ester, at the same time; and n and m are integers independently ranging from about 2 to about 10,000.

Preferred non-homopolymers are set out below:

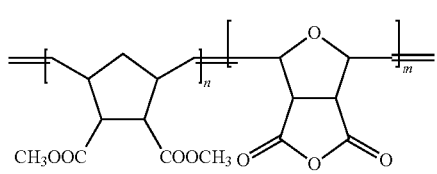

-continued

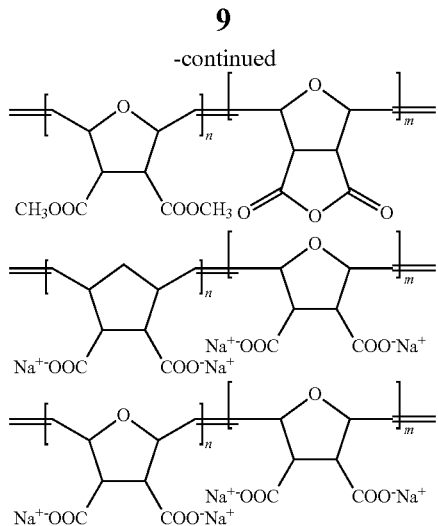

More preferred non-homopolymers are set out below:

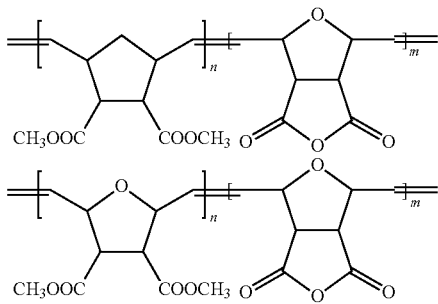

The present invention also provides compositions comprising a non-homopolymer resulting from ring-opening metathesis polymerization of a norbornene dicarboxylic anhydride or oxanorbornene dicarboxylic anhydride moiety with a co-monomer moiety, wherein the non-homopolymer may be blocked or random, and the ratio of blocked norbornene dicarboxylic anhydride or oxanorbornene dicarboxylic anhydride moiety to co-monomer moiety is from about 99:1 to about 1:99, respectively. The compositions comprising the novel ROMP moieties included adhesive, coating, encapsulation, personal care, oilfield, membrane, agricultural, and cleaning compositions. The non-homopolymer in the compositions may be represented by the structure:

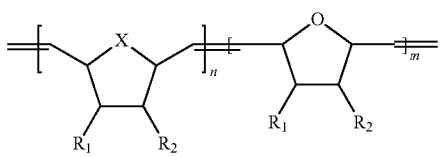

wherein X is a group selected from group consisting of $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; and n and m are integers independently ranging from about 2 to about 10,000.

Preferred non-homopolymers in the compositions are set out below:

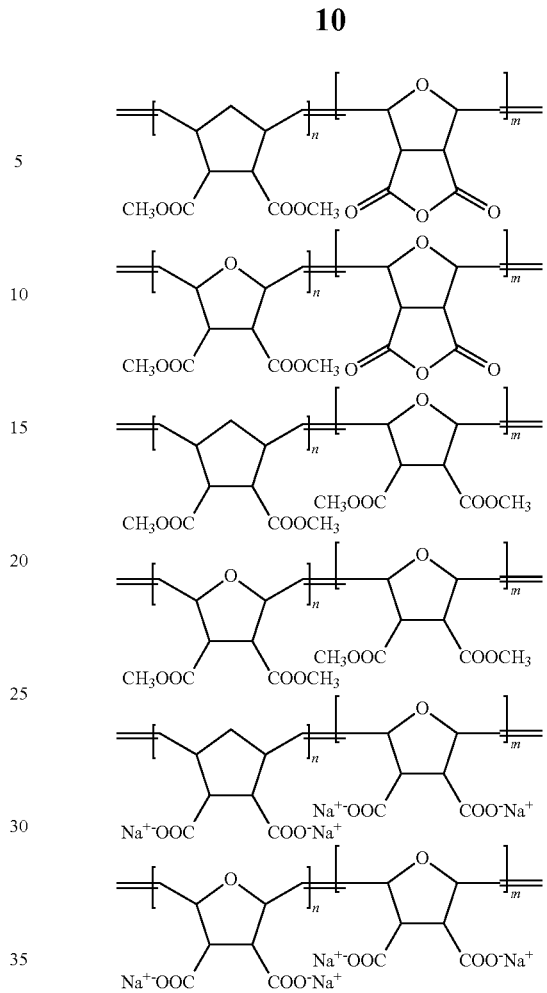

In another embodiment, the non-homopolymer may be represented by the structure:

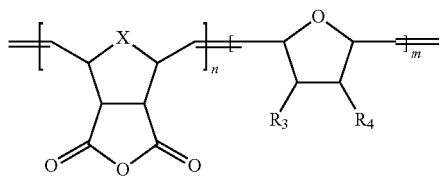

wherein X is selected from group consisting of $CH_2$ and O; $R_3$ and $R_4$ are independently selected from the group consisting of carboxylic acids, carboxylic acid salts, esters, and branched and unbranched alkyl groups, which may be with or without heteroatoms, and mixtures thereof; and n and m are integers independently ranging from about 2 to about 10,000.

$R_3$ and $R_4$ may be independently selected from the group consisting of branched and unbranched alkyl groups, which may be with or without heteroatoms. Preferably, the branched and unbranched alkyl groups are $C_1$-$C_6$alkyl groups. Branched and unbranched $C_1$-$C_6$alkyl groups refer to alkyl groups having from 1 to 6 carbon atoms. The alkyl groups may be straight chained or branched. Branched groups include isopropyl, tert-butyl, and the like. Preferably, $R_3$ and $R_4$ are $C_1$-$C_4$alkyl groups, more preferably $C_1$-$C_2$alkyl groups, and most preferably a methyl group. The term "heteroatom" refers to atoms such as oxygen, nitrogen, sulfur, and phosphorous. Preferably, the heteroatom is oxygen, nitrogen, or sulfur.

The present invention further provides hydrogenated homopolymers resulting from ring-opening metathesis polymerization of an oxanorbornene dicarboxylic anhydride moiety. The hydrogenated homopolymers may be represented by the structure:

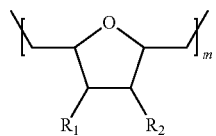

wherein $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; and m is an integer ranging from about 2 to about 10,000.

A preferred hydrogenated homopolymer is set out below:

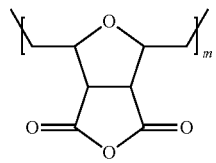

The present invention further provides compositions comprising a hydrogenated homopolymer resulting from ring-opening metathesis polymerization of an oxanorbornene dicarboxylic anhydride moiety. The compositions comprising the novel ROMP moieties included adhesive, coating, encapsulation, personal care, oilfield, membrane, agricultural, and cleaning compositions. The hydrogenated homopolymer in the compositions may be represented by the structure:

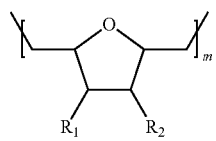

wherein $R_1$, $R_2$, and m are defined above.

A preferred hydrogenated homopolymer in the compositions is set out below:

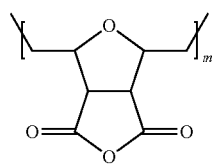

The present invention further provides hydrogenated non-homopolymers resulting from ring-opening metathesis polymerization of a norbornene dicarboxylic anhydride or oxanorbornene dicarboxylic anhydride moiety with a co-monomer moiety, wherein the non-homopolymer may be blocked or random, and the ratio of blocked or random norbornene dicarboxylic anhydride or oxanorbornene dicarboxylic anhydride moiety to co-monomer moiety is from about 99:1 to about 1:99, respectively. The hydrogenated non-homopolymers may be represented by the structure:

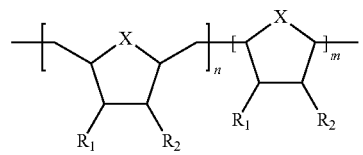

wherein X is a group independently selected from $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; and n and m are integers independently ranging from about 2 to about 10,000.

Preferred hydrogenated non-homopolymers are set out below:

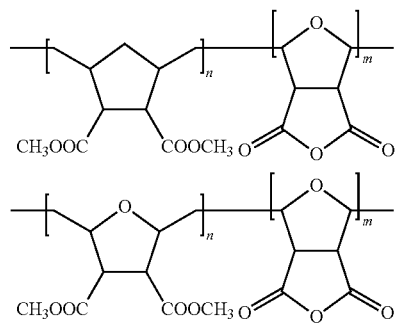

The present invention further provides compositions comprising a hydrogenated non-homopolymer resulting from ring-opening metathesis polymerization of a norbornene dicarboxylic anhydride or oxanorbornene dicarboxylic anhydride moiety with a co-monomer moiety, wherein the non-homopolymer may be blocked or random, and the ratio of blocked or random norbornene dicarboxylic anhydride or oxanorbornene dicarboxylic anhydride moiety to co-monomer moiety is from about 99:1 to about 1:99, respectively. The compositions comprising the novel ROMP moieties included adhesive, coating, encapsulation, personal care, oilfield, membrane, agricultural, and cleaning compositions. The hydrogenated non-homopolymer in the compositions may be represented by the structure:

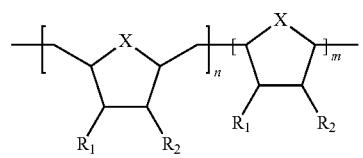

wherein X, $R_1$, $R_2$, n, and m are defined above.

Preferred hydrogenated non-homopolymers in the compositions are set out below:

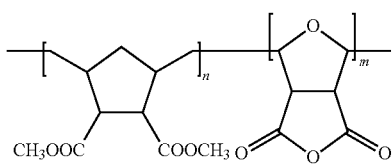

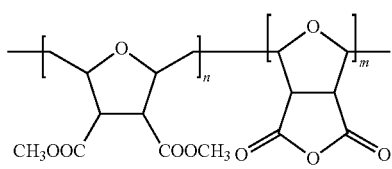

The present invention further provides a wide variety of compositions comprising the above homopolymers resulting from ROMP of an oxanorbornene dicarboxylic anhydride moiety, non-homopolymers resulting from ROMP of a norbornene dicarboxylic anhydride or oxanorbornene dicarboxylic anhydride moiety with a co-monomer moiety, hydrogenated homopolymers resulting from ROMP of an oxanorbornene dicarboxylic anhydride moiety, and hydrogenated non-homopolymers resulting from ROMP of a norbornene dicarboxylic anhydride or oxanorbornene dicarboxylic anhydride moiety with a co-monomer moiety. Preferably, the compositions may be an adhesive, coating, encapsulation, personal care, oilfield, membrane, agricultural, or cleaning compositions. More preferably, the compositions may be an adhesive, coating, encapsulation, personal care, membrane, agricultural, or cleaning compositions.

The syntheses of the norbornene and oxanorbornene monomers of the invention are set out in the examples and, in general, can be prepared by Diels-Alder cycloadditions. The ring-opening metathesis polymerization (ROMP) and copolymerization (ROMCP) of the subject monomers were carried out using commercially available first-generation Grubbs ruthenium catalyst (phenylmethylene bis(tricyclohexylphosphine) ruthenium dichloride), second-generation Grubbs ruthenium catalyst (1,3-bis-(2,4,6-trimethylphenyl)-2-(imidazolidinylidene)-(dichlorophenylmethylene) (tricyclohexylphosphine) ruthenium, and the Umicore initiator (dichloro-(3-phenyl-1H-inden-1-ylidene)-bis(tricyclohexylphosphine) ruthenium (II)). The examples further illustrate the preparation of the non-homopolymers in blocked or random form. The ratio of blocked or random moieties may be from about 99:1 to about 1:99. The examples further illustrate the hydrogenation of the homopolymers and the non-homopolymers. The invention further provides a wide variety of compositions comprising the novel ROMP and ROMCP moieties including adhesive, coating, encapsulation, personal care, oilfield, membrane, agricultural, and cleaning compositions.

The compounds of the present invention can be prepared according to the examples set out below. The examples are presented for purposes of demonstrating, but not limiting, the preparation of the compounds and compositions of this invention.

EXAMPLES

In accordance with the present invention, the following examples are provided to illustrate preferred methods for preparing thermosetting ring-opening metathesis polymerization (ROMP) moieties.

Example 1

Synthesis of exo-oxanorbornene anhydride (Monomer 1, M1)

Scheme 1

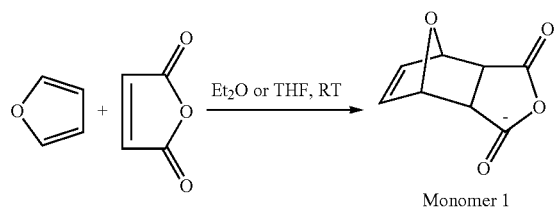

Monomer 1

Materials:
Furan (Aldrich) and maleic anhydride (Aldrich) were used as purchased. Dry $Et_2O$ was supplied through Department. The reaction was carried out in a nitrogen atmosphere.
Procedure:
Maleic anhydride (98 g, 1 mol) was weighed in a three-necked 1 L round-bottom flask, equipped with a magnetic stirrer, a dropping funnel and a reflux condenser. The system was kept under a $N_2$ atmosphere. $Et_2O$ (~350 mL) was added through the septum by a syringe. The mixture was heated to 35° C. to dissolve maleic anhydride. When maleic anhydride was completely dissolved in $Et_2O$, 10% excess of furan (80 mL, 1.1 mol) was added. The reaction mixture was stirred at 35° C. for 48 h until white solid appeared in the flask. The solid was filtered and washed with copious amounts of $Et_2O$. The product was dried under reduced pressure for 12 h at room temperature and then 12 h at 33° C. (yield 80%). The product was found to be pure and was used for future reactions without any purification. However, the product can be recrystallized from $Et_2O$ or THF.
Product Specification:
Monomer 1 was a solid white powder with a melting point of 110.4° C. and a decomposition temperature (i.e., retro Diels-Alder reaction) of 150° C. It was soluble in THF, acetone, DMSO, and water.

Example 2

Synthesis of 5-endo-6-exo-norbornene-2,3-dicarboxylic acid dimethyl ester (Monomer 2, M2)

Scheme 2

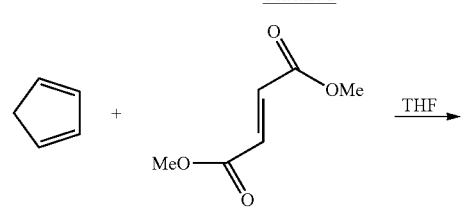

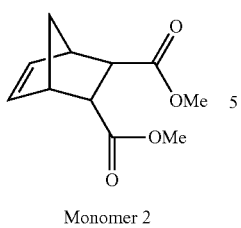

Monomer 2

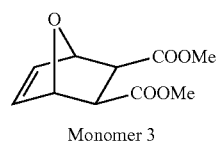

Monomer 3

Materials:

p-toluenesulphonic acid (Aldrich) and diethyl ether (Fisher) were used as received. Dry methanol was supplied through Department. Monomer 1 (synthesized as described above). The reaction was carried out in a nitrogen atmosphere.

Procedure:

Monomer 1 (50.46 g, 0.3 mol) was placed in two-necked round bottom flask (500 mL) equipped with a condenser and a stirrer bar and dissolved in dry methanol (300 mL) at 90° C. for 1 h. Then, a solution of p-toluenesulphonic acid (0.72 g, $3.8 \cdot 10^{-3}$ mol) in dry methanol (5 mL) was added. The reaction mixture was heated at 90° C. for 12 h. The bulk of solvent was removed on a rotary evaporator and $Et_2O$ was added to precipitate the product. The product was recovered and dried under reduced pressure for 24 h at 40° C. (yield 25%).

Product Specification:

Monomer 3 was a solid white powder. It was soluble in THF, acetone, chloroform, and water.

Materials:

Dicyclopentadiene (Aldrich), dim ethyl fumarate (Aldrich) and THF (Fisher) were used as purchased. The synthesis was carried out in a nitrogen atmosphere.

Procedure:

Cracking of Dicyclopentadiene (DCPD).

Two necked round bottom flask (250 mL) fitted with stirrer bar, an air condenser and a distillation head was filled with DCPD and heated to 185° C. DCPD cracked at 160° C. to produce cyclopentadiene (CPD, b.p.=40° C.). CPD was collected in a pre-weighed Shlenk immersed in dry ice to prevent fast dimerisation of CPD.

Diels-Alder reaction between CPD and dimethyl fumarate (DMFum).

Dimethyl fumarate (200.43 g, 1.4 mol) was dissolved in THF (1.2 L) at 60° C. in a round-bottomed flask (2 L) fitted with a dry ice/acetone dropping funnel, condenser, thermometer, and stirrer bar. Freshly cracked CPD (92.4 g, 1.4 mol) was added dropwise with intensive stirring. During the addition of CPD temperature rose from 60° C. up to 70° C. The reaction proceeded for 24 h at 60° C. The reaction was stopped and half of the solvent was removed on a rotary evaporator. Then the reaction mixture was placed in the freezer. White solid product was recovered and dried under reduced pressure for 24 h at 28° C. (yield 90%). Note: CPD should be weighed accurately. Excess of CPD in reaction mixture is dimerised during the reaction to DCPD, which cannot be separated from product.

Product Specification:

Monomer 2 was a solid white powder with a melting point of 34.6° C.-35.8° C., and a decomposition temperature (i.e., retro Diels-Alder reaction) of 151° C. It was soluble in THF, acetone, chloroform, hexane, and toluene.

Example 3

Synthesis of
5,6-exo,exo-oxanorbornene-2,3-dicarboxylic acid dimethyl ester (Monomer 3, M3)

Scheme 3

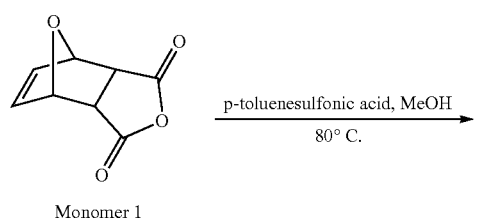

Monomer 1

Example 4

Synthesis of
5,6-endo,exo-oxanorbornene-2,3-dicarboxylic acid dimethyl ester (Monomer 4, M4)

Scheme 4

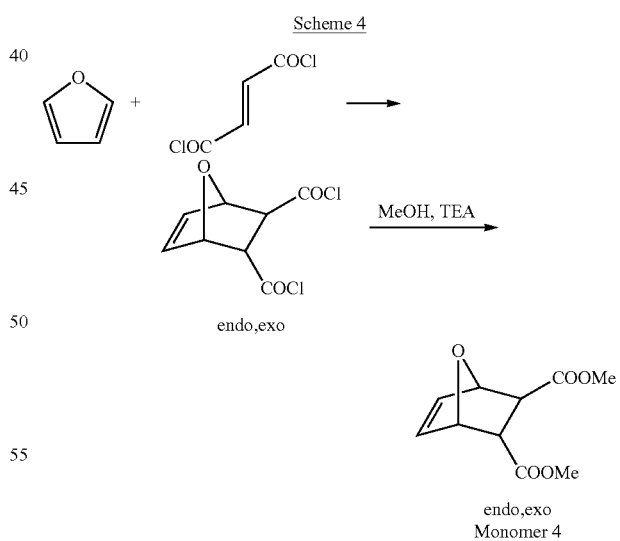

endo,exo endo,exo
Monomer 4

Materials:

Fumaryl chloride (Aldrich) and diethyl ether (Fisher) were used as received. Furan was shaken with NaOH, dried ($MgSO_4$) and distilled under $N_2$. Dry methanol was supplied through Department. Triethylamine (Fluka) was dried with CaH2, then distilled and collected over 4 Å molecular sieves. The reaction was carried out in a nitrogen atmosphere.

Procedure:

(1.5 mL, 13 mmol) was added dropwise to pre-cooled (0° C., ice bath) furan (1 mL, 13 mmol). After stirring at 0° C. for 30 min, the solution entirely solidified to give a pale yellow solid. Anhydrous methanol (5 mL, 0.1 mol) and distilled triethylamine (4.2 mL, 30 mmol) were dissolved in ether (50 mL) at 10° C. To this solution, the solid obtained as described above was added cautiously in small portions and the resulting suspension was stirred for 30 min. Then cold water (40 mL) was added to give a solution that was extracted with ether (2×20 mL). The organic extracts were combined, washed with water (40 mL) and brine solution (20 mL), dried ($MgSO_4$) and concentrated in vacuo to give a fluffy solid (pale yellow). It was recrystallized as white needles from ether in 72% yield.

Product Specification:

Monomer 4 existed as solid white crystals that were soluble in THF, acetone, chloroform, and ether.

Example 5

Ring-Opening Metathesis Polymerization (ROMP) and Copolymerization (ROMCP) in the Presence of Umicore Ruthenium Initiator (UM)

Materials for all ROMP and ROMCP Reactions in the Presence of Umicore Initiator:

Dichloro-(3-phenyl-1H-inden-1-ylidene)bis(tricyclohexylphosphine) ruthenium(II) [Umicore catalyst (UM), Strem], hydroquinone (Aldrich) and hexane (Fisher) were used as received. THF (Fisher) was deoxygenated before use. Monomer 1, Monomer 2 and Monomer 3 were obtained as described above. The reactions were carried out under a nitrogen atmosphere.

ROMP of Monomer 1 (M1)

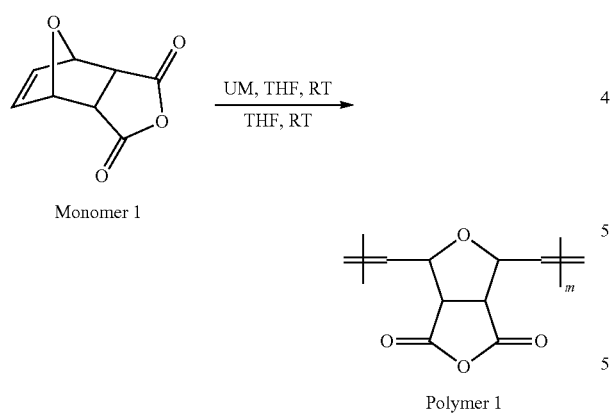

Procedure:

M1 (1 g, 0.006 mol) was dissolved in deoxygenated THF (~10 mL) and then the solution of UM (0.056 g, $6.02 \cdot 10^{-5}$ mol) in THF (2 mL) was added to the solution of M1 (mole ratio [M]/[Ru]=100) with constant stirring. The gel was formed during the reaction. The reaction was stopped after 12 h by adding of vinylethyl ether (0.1 mL) and stirring for 30 min. More THF was added and then the polymer was precipitated into hexane (10-fold excess) containing hydroquinone (around 0.1 g as an inhibitor). The product Polymer 1 was dried under reduced pressure for 40 h at 35° C. (yield 98%).

Product Specification:

Brown colored gel was not soluble in THF, DMF, hexane, or water.

Example 6

ROMP of Monomer 2 (M2)

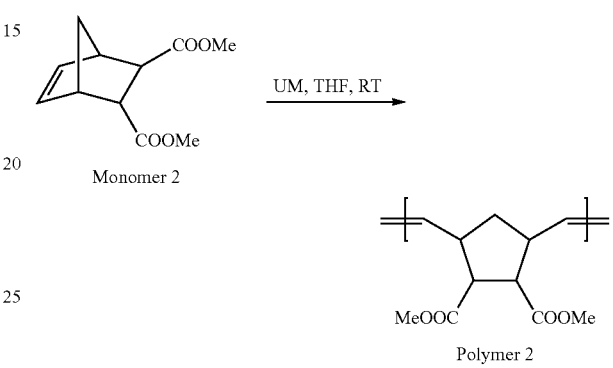

Procedure:

M2 (0.57 g, 0.0027 mol) was dissolved in deoxygenated THF (~5 mL) and then the solution of UM (0.0126 g, $1.36 \cdot 10^{-5}$ mol) in THF (1 mL) was added to the solution of M2 (mole ratio [M]/[Ru]=200) with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Polymer 2 was dried under reduced pressure for 40 h at 35° C. (yield 90%).

Product Specification:

Polymer was quite rubbery and pale pink color, and was soluble in THF, acetone, and chloroform.

Example 7

ROMP of Monomer 3 (M3)

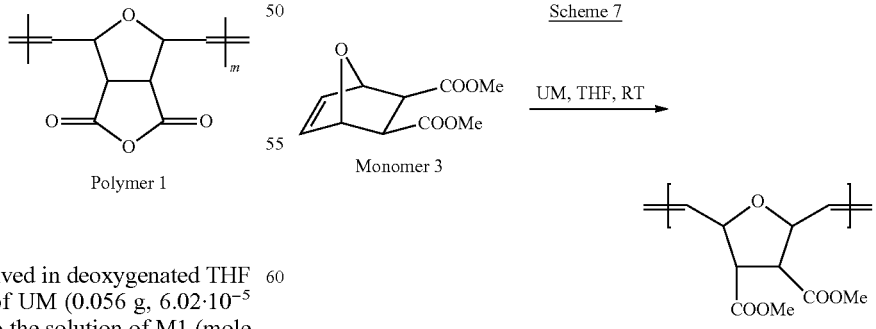

Procedure:

M3 (0.48 g, 0.0022 mol) was dissolved in deoxygenated THF (~5 mL) and then the solution of UM (0.0104 g, 1.12·10⁻⁵ mol) in THF (1 mL) was added to the solution of M3 (mole ratio [M]/[Ru]=200) with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Polymer 3 was dried under reduced pressure for 40 h at 35° C. (yield 98%).

Product Specification:

Polymer was quite rubbery and pale pink color, and was soluble in THF, acetone, and chloroform.

Example 8

ROMP of Monomer 4 (M4)

Scheme 8

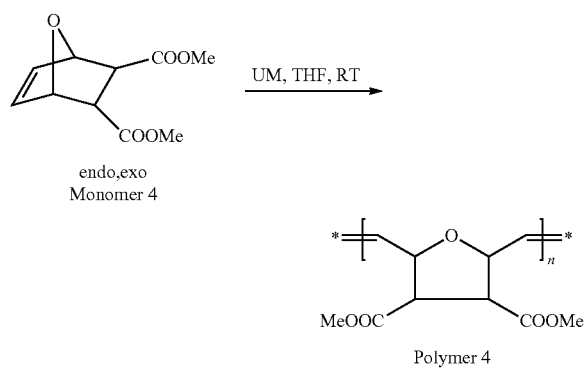

endo,exo
Monomer 4

Polymer 4

Procedure:

M3 (0.28 g, 0.00123 mol) was dissolved in deoxygenated THF (~5 mL) and then the solution of UM (0.0057 g, 6.17·10⁻⁶ mol) in THF (1 mL) was added to the solution of M4 (mole ratio [M]/[Ru]=200) with constant stirring. The reaction was stopped after 12 h by adding of vinylethyl ether (0.1 mL) and stirring for 30 min. The polymer was precipitated into hexane (10-fold excess) containing hydroquinone (around 0.05 g as an inhibitor). The product Polymer 4 was dried under reduced pressure for 40 h at 35° C. (yield 85%).

Example 9

Ring-Opening Metathesis Random Copolymerization of M2 and M1, [M2]/[M1]/[UM]=150/50/1

Scheme 9

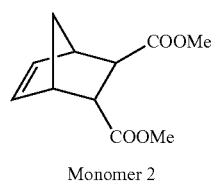

Monomer 2

-continued

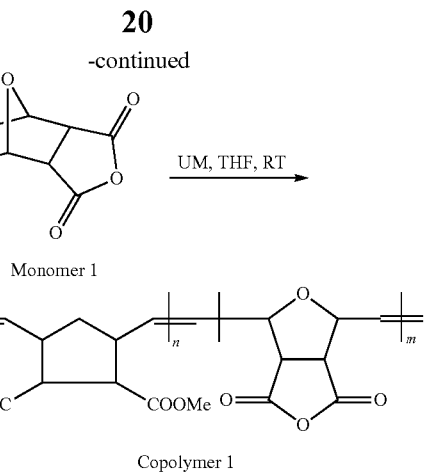

Monomer 1

Copolymer 1

Procedure:

Mixture of M1 (0.039 g, 2.38·10⁻⁴ mol) and M2 (0.15 g, 7.14·10⁻⁴ mol) was dissolved in deoxygenated THF (~5 mL) and then the solution of UM (0.0044 g, 4.76·10⁻⁶ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Copolymer 1 was dried under reduced pressure for 40 h at 35° C. (yield 89% after second precipitation). ¹H NMR measurements revealed the content in Copolymer 1 was 23% M1 and 77% M2.

Product Specification:

Copolymer 1 was pale yellow in color. The copolymer was soluble in THF, acetone, DMF, DCM and chloroform, and was soluble in ethanol or methanol if left for a long time.

Example 10

Ring-Opening Metathesis Random Copolymerization of M2 and M1, [M2]/[M1]/[UM]=100/100/1

Scheme 10

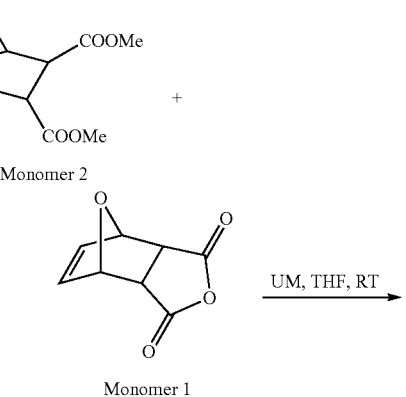

Monomer 2

Monomer 1

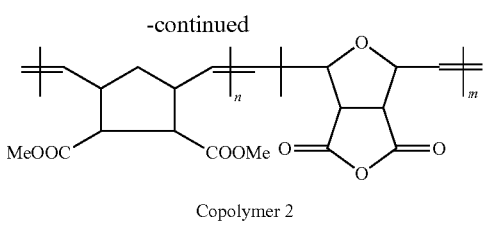

Copolymer 2

Procedure:

Mixture of M1 (0.079 g, 4.76·10$^{-4}$ mol) and M2 (0.1 g, 4.76·10$^{-4}$ mol) was dissolved in deoxygenated THF (~6 mL) and then the solution of UM (0.0044 g, 4.76·10$^{-6}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Copolymer 2 was dried under reduced pressure for 40 h at 35° C. (yield 85% after second precipitation). $^1$H NMR measurements revealed the content in Copolymer 2 was 43% M1 and 57% M2.

Product Specification:

Copolymer 2 was pale yellow in color. The copolymer was soluble in THF, acetone and DMF, and was soluble in ethanol or methanol if left for a long time.

Example 11

Ring-Opening Metathesis Random Copolymerization of M2 and M1, [M2]/[M1]/[UM]=50/150/1

Scheme 11

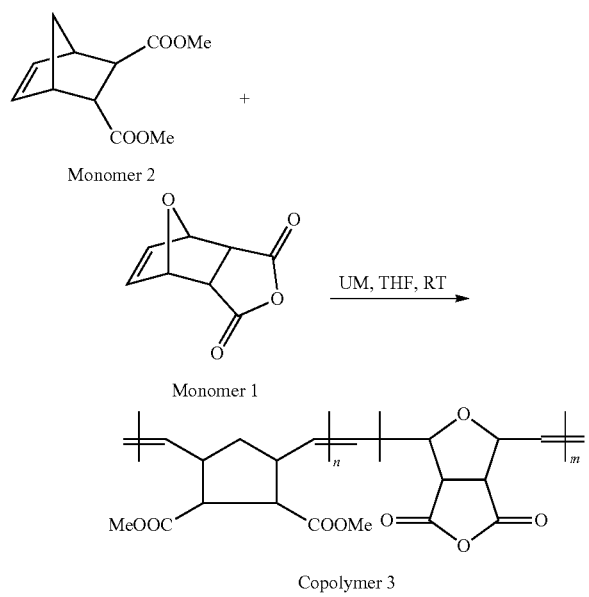

Copolymer 3

Procedure:

Mixture of M1 (0.12 g, 7.14·10$^{-4}$ mol) and M2 (0.05 g, 2.38·10$^{-4}$ mol) was dissolved in deoxygenated THF (~10 mL) and then the solution of UM (0.0044 g, 4.76·10$^{-6}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). Received Copolymer 3 was not soluble completely in THF after reprecipitation in to hexane. The product Copolymer 3 was dried under reduced pressure for 40 h at 35° C. (yield 86% after second precipitation). $^1$H NMR measurements revealed the content in Copolymer 3 was 66% M1 and 34% M2.

Product Specification:

Copolymer 3 was pale yellow in color.

Example 12

Ring-Opening Metathesis Random Copolymerization of M3 and M1, [M3]/[M1]/[UM]=150/50/1

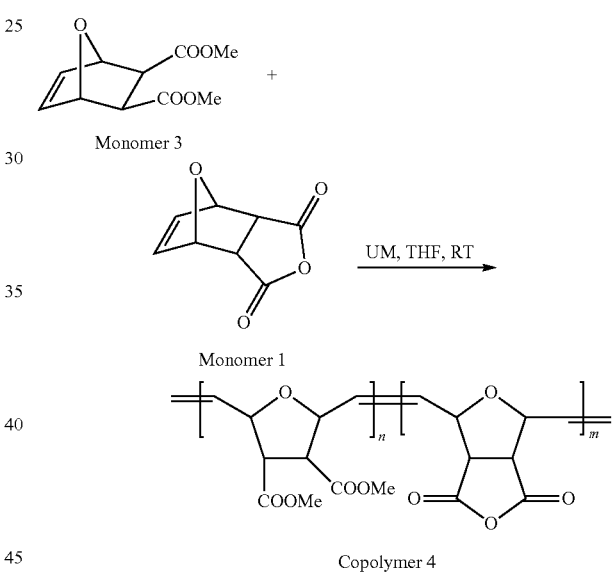

Copolymer 4

Procedure:

Mixture of M1 (0.039 g, 2.38·10$^{-4}$ mol) and M3 (0.15 g, 7.14·10$^{-4}$ mol) was dissolved in deoxygenated THF (~5 mL) and then the solution of UM (0.0044 g, 4.76·10$^{-6}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Copolymer 4 was dried under reduced pressure for 40 h at 35° C. (yield 90% after second precipitation). The chemical shifts of two monomer units were overlapping and hence difficult to define the composition by $^1$H NMR Product Specification:

Copolymer 4 was pale yellow in color. The copolymer was soluble in THF, DMF, DCM and chloroform, and was soluble in ethanol or methanol if left for a long time.

Example 13

Ring-Opening Metathesis Random Copolymerization of M3 and M1, [M3]/[M1]/[UM]=100/100/1

Scheme 13

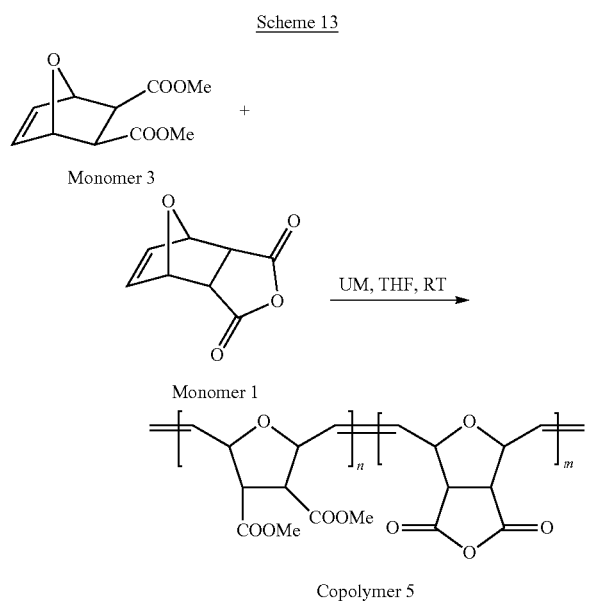

Monomer 3

Monomer 1

Copolymer 5

Procedure:

Mixture of M1 (0.079 g, 4.76·10$^{-4}$ mol) and M3 (0.1 g, 4.76·10$^{-4}$ mol) was dissolved in deoxygenated THF (~6 mL) and then the solution of UM (0.0044 g, 4.76·10$^{-6}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Copolymer 5 was dried under reduced pressure for 40 h at 35° C. (yield 93% after second precipitation). The chemical shifts of two monomer units were overlapping and hence difficult to define the composition by $^1$H NMR.

Product Specification:

Copolymer 5 was pale yellow in color. Copolymer 5 was soluble in THF, acetone and DMF, and was soluble in ethanol or methanol if left for a long time.

Example 14

Ring-Opening Metathesis Random Copolymerization of M3 and M1, [M3]/[M1]/[UM]=50/150/1

Scheme 14

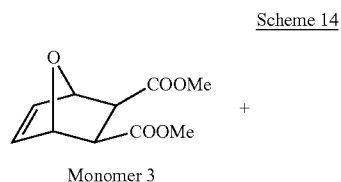

Monomer 3

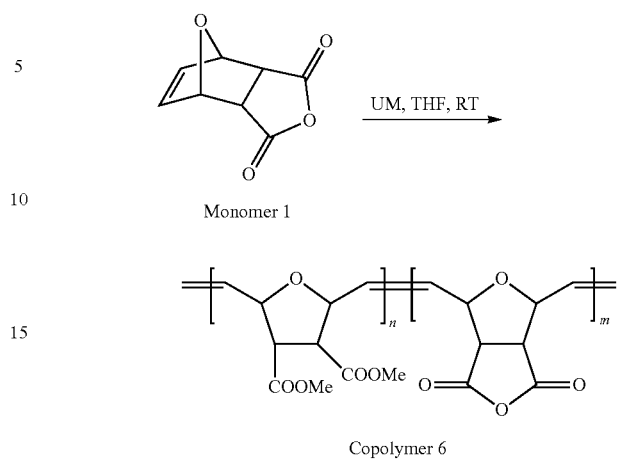

Monomer 1

Copolymer 6

Procedure:

Mixture of M1 (0.12 g, 7.14·10$^{-4}$ mol) and M3 (0.05 g, 2.38·10$^{-4}$ mol) was dissolved in deoxygenated THF (~10 mL) and then the solution of UM (0.0044 g, 4.76·10$^{-6}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). Received Copolymer 6 was not soluble completely in THF after reprecipitation in to hexane. The product Copolymer 6 was dried under reduced pressure for 40 h at 35° C. (yield 86% after second precipitation). The chemical shifts of two monomer units were overlapping and hence difficult to define the composition by $^1$H NMR.

Product Specification:

Copolymer 6 was pale yellow in color.

Example 15

Ring-Opening Metathesis Random Copolymerization of M4 and M1, [M4]/[M1]/[UM]=150/50/1

Scheme 15

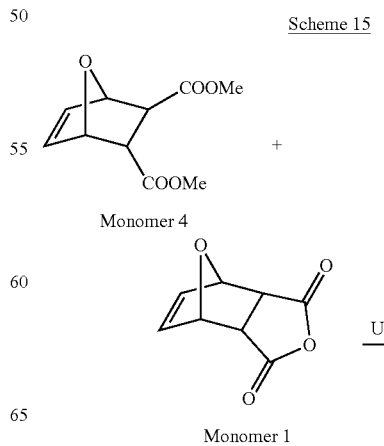

Monomer 4

Monomer 1

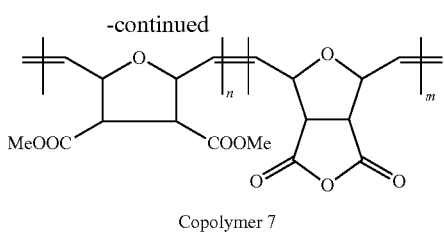

Copolymer 7

Procedure:

Mixture of M1 (0.076 g, 3.09·10⁻⁴ mol) and M4 (0.196 g, 9.26·10⁻⁴ mol) was dissolved in deoxygenated THF (~5 mL) and then the solution of UM (0.0057 g, 6.17·10⁻⁶ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.05 g as an inhibitor). The product Copolymer 7 was dried under reduced pressure for 40 h at 35° C. (yield 90% after second precipitation). The chemical shifts of two monomer units were overlapping and hence difficult to define the composition by $^1$H NMR Product Specification:

Copolymer 7 was pale yellow in color. This copolymer was soluble in THF, DMF, DCM and chloroform.

Example 16

Ring-Opening Metathesis Random Copolymerization of M4 and M1, [M4]/[M1]/[UM]=100/100/1

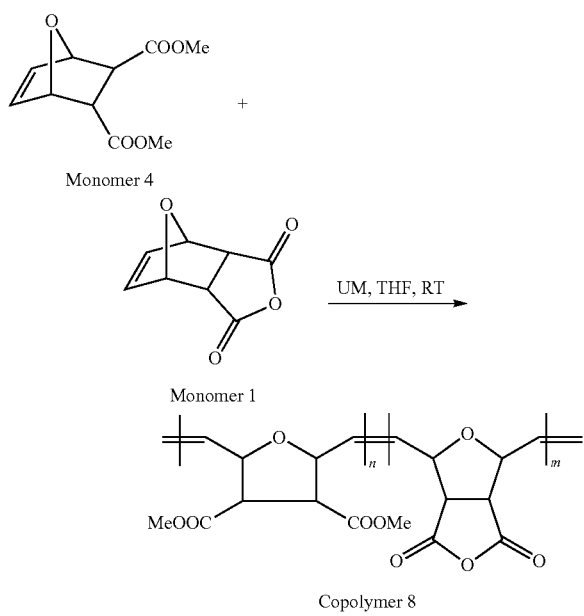

Procedure:

Mixture of M1 (0.138 g, 8.34·10⁻⁴ mol) and M4 (0.18 g, 8.34·10⁻⁴ mol) was dissolved in deoxygenated THF (~6 mL) and then the solution of UM (0.0077 g, 8.34·10⁻⁶ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.05 g as an inhibitor). The product Copolymer 8 was dried under reduced pressure for 40 h at 35° C. (yield 93% after second precipitation). The chemical shifts of two monomer units were overlapping and hence difficult to define the composition by $^1$H NMR.

Product Specification:

Copolymer 8 was pale yellow in color, and was soluble in THF, acetone and DMF.

Example 17

Ring-Opening Metathesis Random Copolymerization of M4 and M1, [M4]/[M1]/[UM]=50/150/1

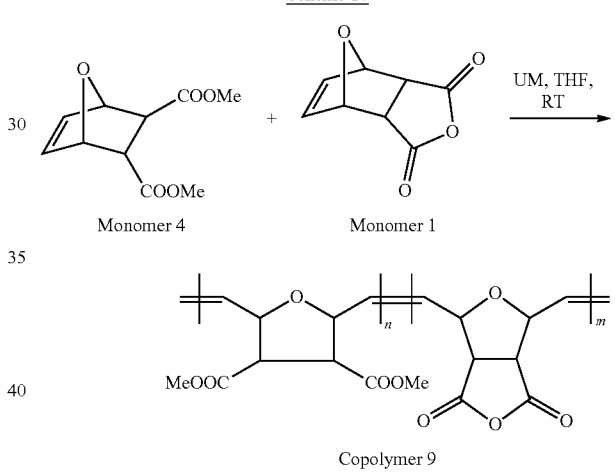

Procedure:

Mixture of M1 (0.264 g, 0.0016 mol) and M4 (0.112 g, 5.3·10⁻⁴ mol) was dissolved in deoxygenated THF (~10 mL) and then the solution of UM (0.0098 g, 1.06·10⁻⁵ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). Received Copolymer 9 was not soluble completely in THF after reprecipitation in to hexane. The product Copolymer 9 was dried under reduced pressure for 40 h at 35° C. (yield 86% after second precipitation). The chemical shifts of two monomer units were overlapping and hence difficult to define the composition by $^1$H NMR.

Product Specification:

Copolymer 9 was pale yellow in color, and was soluble in THF, acetone and DMF.

Example 18

Ring-Opening Metathesis Block Copolymerization of M2 and M1, [M2]/[M1]/[UM]=75/25/1

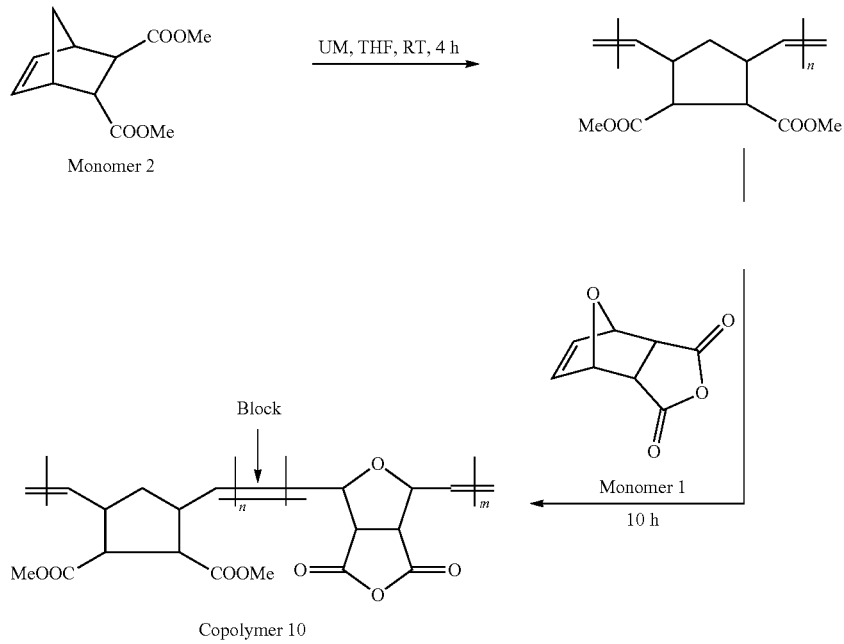

Scheme 18

Procedure:

M2 (0.075 g, $3.57 \cdot 10^{-4}$ mol) was dissolved in deoxygenated THF (~5 mL) and then the solution of UM (0.0044 g, $4.76 \cdot 10^{-6}$ mol) in THF (0.7 mL) was added to the solution of M2 with constant stirring. The reaction mixture was stirred for 4 h and then solution of M1 (0.02 g, $1.19 \cdot 10^{-4}$ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 10 was dried under reduced pressure for 40 h at 35° C. (yield 98% after the second precipitation). $^1$H NMR measurements revealed the content in Copolymer 10 was 18% M1 and 82% M2.

Product Specification

Copolymer 10 was pale yellow in color. This copolymer was soluble in THF, DMF, DCM and chloroform, and was soluble in ethanol or methanol if left for a long time.

Example 19

Ring-Opening Metathesis Block Copolymerization of M2 and M1, [M2]/[M1]/[UM]=50/50/1

Scheme 19

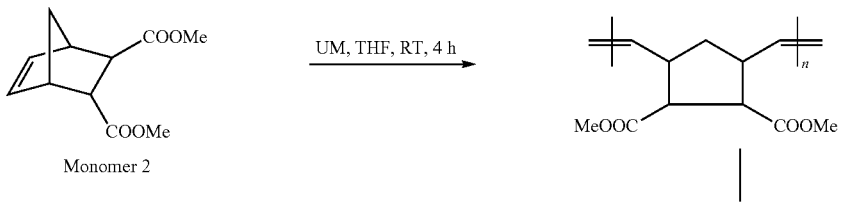

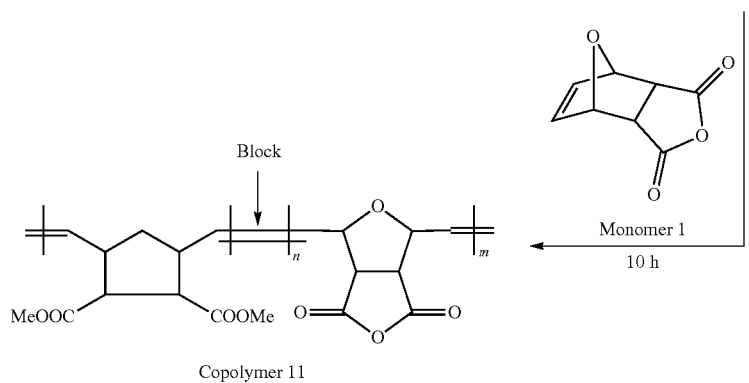

Copolymer 11

Procedure:

M2 (0.05 g, 4.76·10$^{-4}$ mol) was dissolved in deoxygenated THF (~5 mL) and then the solution of UM (0.0044 g, 4.76·10$^{-6}$ mol) in THF (0.7 mL) was added to the solution of M2 with constant stirring. The reaction mixture was stirred for 4 h and then solution of M1 (0.04 g, 4.76·10$^{-4}$ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 11 was dried under reduced pressure for 40 h at 35° C. (yield 92% after the second precipitation). $^1$H NMR measurements revealed the content in Copolymer 11 was 18% M1 and 82% M2.

Product Specification

Copolymer 11 was pale yellow in color, and was soluble in THF, DMF and acetone. Copolymer 11 was soluble in ethanol or methanol if left for a long time.

Example 20

Ring-Opening Metathesis Block Copolymerization of M2 and M1, [M2]/[M1]/[UM]=25/75/1

Scheme 20

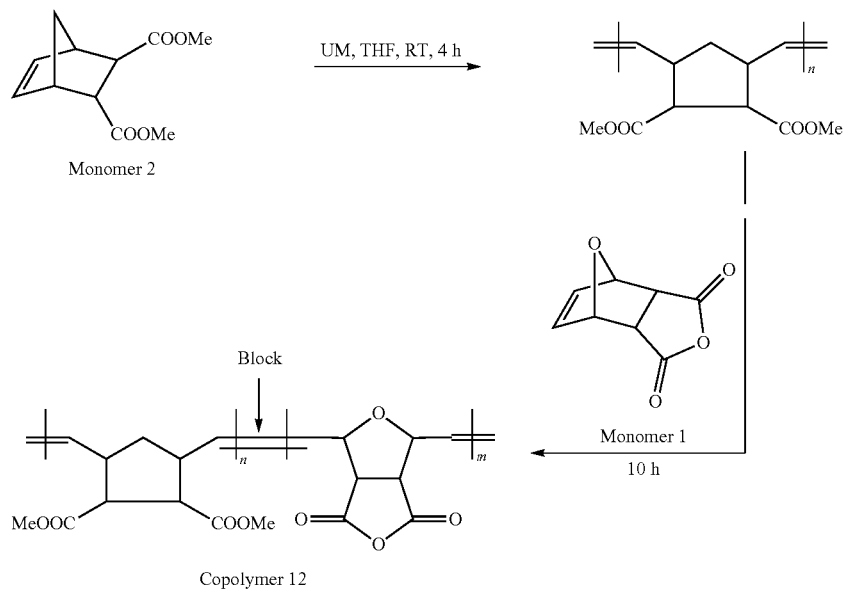

Copolymer 12

Procedure:

M2 (0.025 g, 1.19·10$^{-4}$ mol) was dissolved in deoxygenated THF (~10 mL) and then the solution of UM (0.0044 g, 4.76·10$^{-6}$ mol) in THF (0.7 mL) was added to the solution of M2 with constant stirring. The reaction mixture was stirred for 4 h and then solution of M1 (0.06 g, 3.57·10$^{-4}$ mol) in THF was added dropwise. The reaction mixture was stirred during for 10 h. A gel was formed during the reaction. The reaction was stopped by the addition of vinylethyl ether (0.1 mL) and stirring for 30 min. The polymer was precipitated into hexane (10-fold excess) containing hydroquinone (around 0.1 g as an inhibitor). The product Copolymer 12 was dried under reduced pressure for 40 h at 35° C. (yield 89%). $^1$H NMR measurements revealed the content in Copolymer 12 was 75% M1 and 23% M2.

Product Specification

Copolymer 12 was pale yellow in color. It was insoluble in THF, DMF, DCM and chloroform.

Example 21

Ring-Opening Metathesis Block Copolymerization of M3 and M1, [M3]/[M1]/[UM]=75/25/1

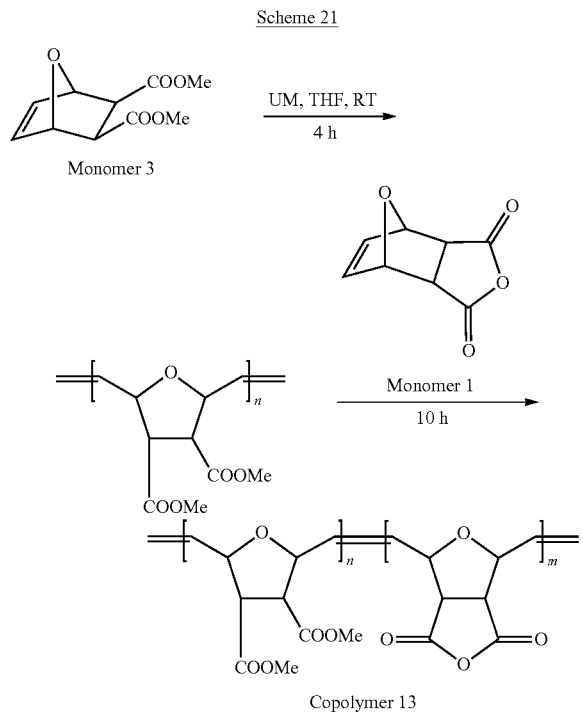

Copolymer 13

Procedure:

M3 (0.075 g, 3.57·10$^{-4}$ mol) was dissolved in deoxygenated THF (~5 mL) and then the solution of UM (0.0044 g, 4.76·10$^{-6}$ mol) in THF (0.7 mL) was added to the solution of M3 with constant stirring. The reaction mixture was stirred for 4 h and then solution of M1 (0.02 g, 1.19·10$^{-4}$ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 13 was dried under reduced pressure for 40 h at 35° C. (yield 92% after the second precipitation). The chemical shifts of two monomer units were overlapping and hence difficult to define the composition by $^1$H NMR.

Product Specification

Copolymer 13 was pale yellow in color. It was soluble in THF, DMF, DCM and chloroform, and was soluble in ethanol or methanol if left for a long time.

Example 22

Ring-Opening Metathesis Block Copolymerization of M3 and M1, [M3]/[M1]/[UM]=50/50/1

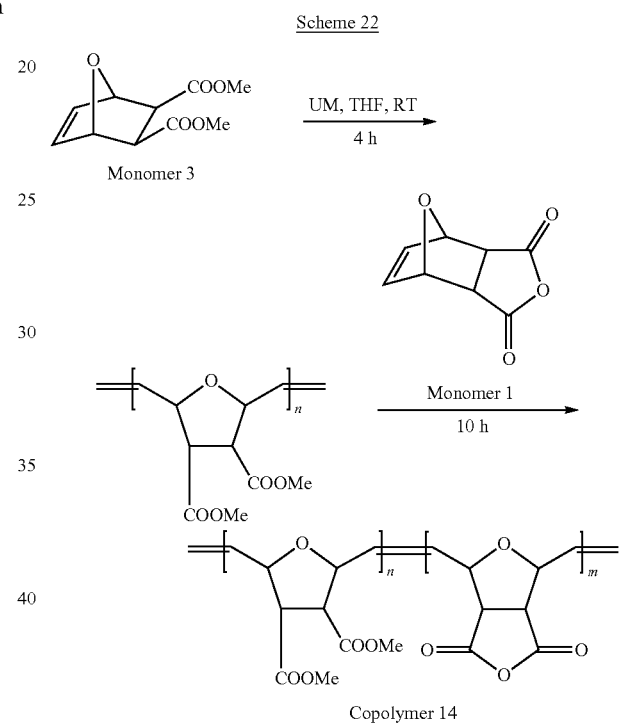

Copolymer 14

Procedure:

M3 (0.05 g, 4.76·10$^{-4}$ mol) was dissolved in deoxygenated THF (~5 mL) and then the solution of UM (0.0044 g, 4.76·10$^{-6}$ mol) in TI-IF (0.7 mL) was added to the solution of M3 with constant stirring. The reaction mixture was stirred for 4 h and then solution of M1 (0.04 g, 4.76·10$^{-4}$ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 14 was dried under reduced pressure for 40 h at 35° C. (yield 96% after the second precipitation). The chemical shifts of two monomer units were overlapping and hence difficult to define the composition by $^1$H NMR.

Product Specification

Copolymer 14 was pale yellow in color. It was soluble in THF, DMF, DCM and chloroform, and was soluble in ethanol or methanol if left for a long time.

Example 23

Ring-Opening Metathesis Block Copolymerization of M3 and M1, [M3]/[M1]/[UM]=25/75/1

Scheme 23

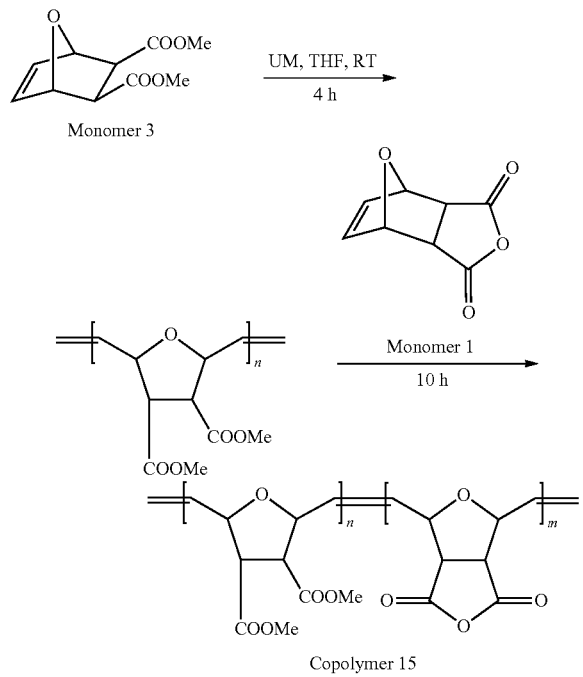

Copolymer 15

Procedure:

M3 (0.025 g, 1.19·10$^{-4}$ mol) was dissolved in deoxygenated THF (~10 mL) and then the solution of UM (0.0044 g, 4.76·10$^{-6}$ mol) in THF (0.7 mL) was added to the solution of M3 with constant stirring. The reaction mixture was stirred for 4 h and then solution of M1 (0.06 g, 3.57·10$^{-4}$ mol) in THF was added dropwise. The reaction mixture was stirred during for 10 h. A gel was formed during the reaction. The reaction was stopped by the addition of vinylethyl ether (0.1 mL) and stirring for 30 min. The polymer was precipitated into hexane (10-fold excess) containing hydroquinone (around 0.1 g as an inhibitor). The product Copolymer 15 was dried under reduced pressure for 40 h at 35° C. (yield 89%). The chemical shifts of two monomer units were overlapping and hence difficult to define the composition by $^1$H NMR.

Product Specification

Copolymer 15 was pale yellow in color. It was insoluble in THF, DMF, DCM and chloroform.

Example 24

Ring-Opening Metathesis Block Copolymerization of M2 and M3, [M2]/[M3]/[UM]=50/50/1

Scheme 24

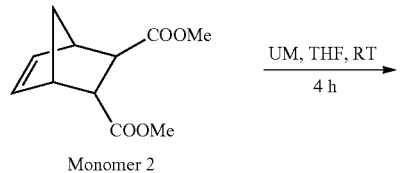

Monomer 2

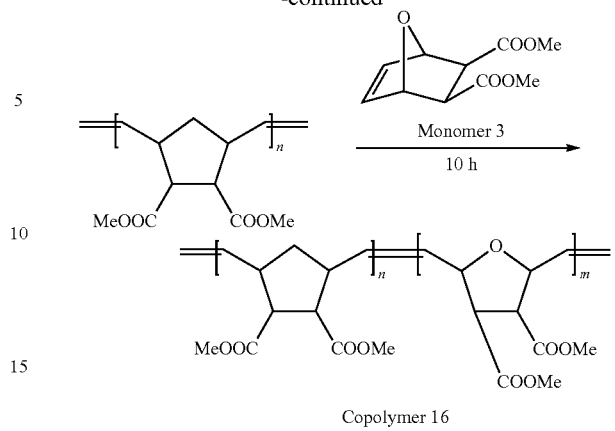

Copolymer 16

Procedure:

M2 (0.05 g, 4.76·10$^{-4}$ mol) was dissolved in deoxygenated TRF (~5 mL) and then the solution of UM (0.0044 g, 4.76·10$^{-6}$ mol) in THF (0.7 mL) was added to the solution of M2 with constant stirring. The reaction mixture was stirred for 4 h and then solution of M3 (0.05 g, 4.76·10$^{-4}$ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 16 was dried under reduced pressure for 40 h at 35° C. (yield 88% after the second precipitation). $^1$H NMR measurements revealed the content in Copolymer 13 was 58% M2 and 42% M3.

Product Specification

Copolymer 16 was pale yellow in color. It was soluble in THF, DMF, DCM and chloroform.

Example 25

Ring-Opening Metathesis Block Copolymerization of M4 and M1, [M3]/[M1]/[UM]=100/100/1

Scheme 25

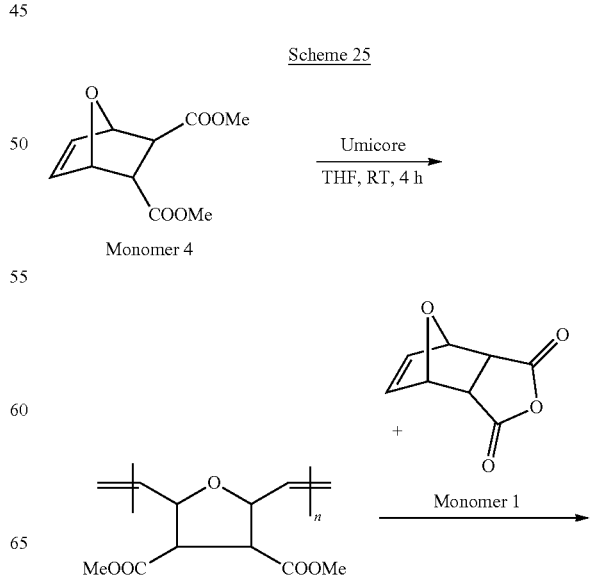

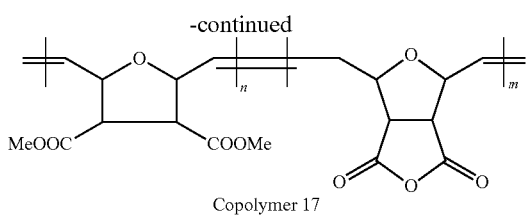

Copolymer 17

Procedure:

M4 (0.220 g, 1.04·10⁻³ mol) was dissolved in deoxygenated THF (~5 mL) and then the solution of UM (0.0096 g, 1.04·10⁻⁵ mol) in THF (0.7 mL) was added to the solution of M4 with constant stirring. The reaction mixture was stirred for 4 h and then solution of M1 (0.172 g, 1.04·10⁻³ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 17 was dried under reduced pressure for 40 h at 35° C. (yield 92% after the second precipitation). The chemical shifts of two monomer units were overlapping and hence difficult to define the composition by $^1$H NMR.

Product Specification

Copolymer 17 was pale yellow in color. It was soluble in THF, DMF, DCM and chloroform.

Example 26

Ring-Opening Metathesis Block Copolymerization of M4 and M1, [M4]/[M1]/[UM]=50/150/1

Scheme 26

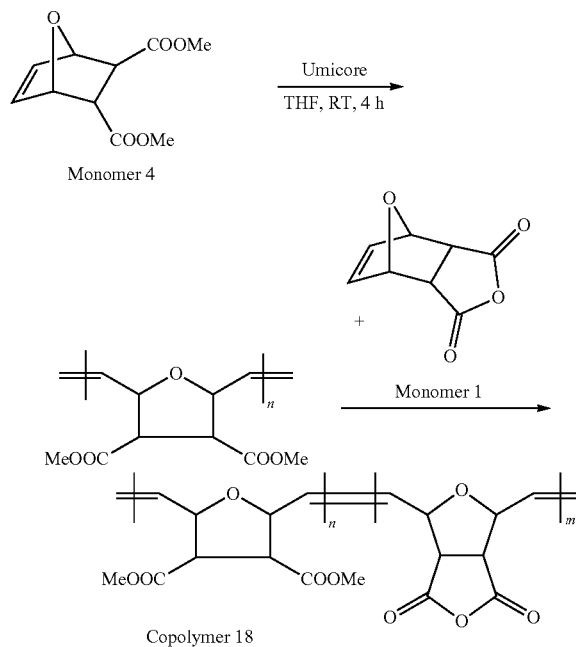

Procedure:

M4 (0.083 g, 3.95·10⁻⁴ mol) was dissolved in deoxygenated THF (~5 mL) and then the solution of UM (0.0073 g, 7.9·10⁻⁶ mol) in THF (0.7 mL) was added to the solution of M4 with constant stirring. The reaction mixture was stirred for 4 h and then solution of M1 (0.197 g, 0.0012 mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.05 g as an inhibitor). The product Copolymer 18 was dried under reduced pressure for 40 h at 35° C. (yield 91% after the second precipitation). The chemical shifts of two monomer units were overlapping and hence difficult to define the composition by $^1$H NMR.

Product Specification

Copolymer 18 was pale yellow in color. It was soluble in THF, DMF, DCM and chloroform, soluble in ethanol or methanol if left for a long time.

Example 27

Ring-Opening Metathesis Polymerization (ROMP) and Copolymerization (ROMCP) in the Presence of Grubbs Ruthenium Initiator 1$^{st}$ Generation (G1)

Materials for all ROMP and ROMCP Reactions in the Presence of G1 Initiator:

Grubbs ruthenium initiator 1st generation (G1, Aldrich), hydroquinone (Aldrich) and hexane (Fisher) were used as received. THF (Fisher) was deoxygenated before use. Monomer 1, Monomer 2 and Monomer 3 were obtained as described above. The reactions were carried out under a nitrogen atmosphere.

ROMP of Monomer 1 (M1)

Scheme 27

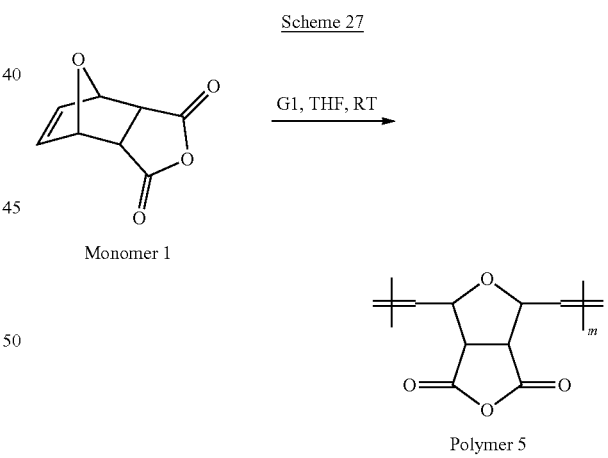

Procedure:

M1 (2 g, 0.012 mol) was dissolved in deoxygenated THF (~20 mL) and then the solution of G1 (0.05 g, 6.07·10⁻⁵ mol) in THF (1 mL) was added to the solution of M1 (mole ratio [M]/[Ru]=200) with constant stirring. The gel was formed during the reaction. The reaction was stopped after 12 h by adding of vinylethyl ether (0.1 mL) and stirring for 30 min. More THF was added and then the polymer was precipitated into hexane (10-fold excess) containing hydroquinone (around 0.1 g as an inhibitor). The product Polymer 5 was dried under reduced pressure for 40 h at 35° C. (yield 95%).

Product Specification:

The synthesized brown-colored gel was not soluble in THF, DMF, hexane, or water.

Example 28

ROMP of Monomer 2 (M2)

Scheme 28

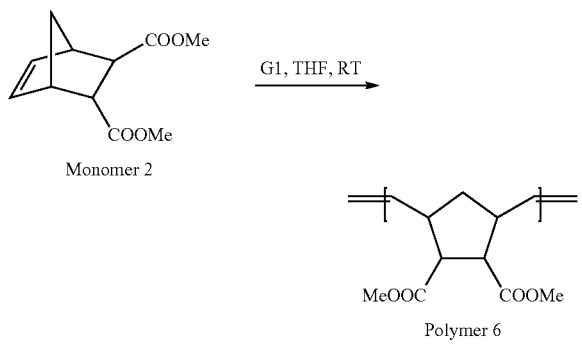

Monomer 2

Polymer 6

Procedure:

M2 (0.64 g, 0.0031 mol) was dissolved in deoxygenated THF (~5 mL) and then the solution of G1 (0.0126 g, $1.53 \cdot 10^{-5}$ mol) in THF (1 mL) was added to the solution of M2 (mole ratio [M]/[Ru]=200) with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Polymer 6 was dried under reduced pressure for 40 h at 35° C. (yield 95%).

Product Specification:

The polymer was quite rubbery and was pale pink in color. It was soluble in THF, acetone, and chloroform.

Example 29

ROMP of Monomer 3 (M3)

Scheme 29

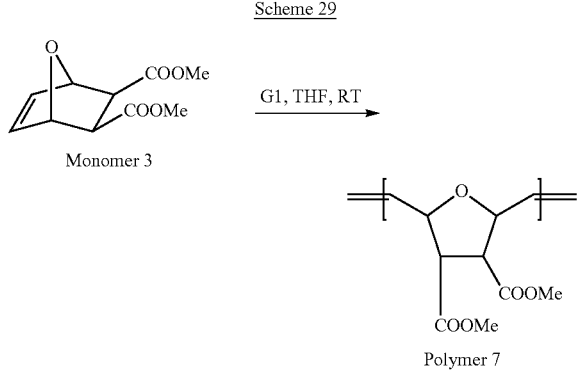

Monomer 3

Polymer 7

Procedure:

M3 (0.53 g, 0.0025 mol) was dissolved in deoxygenated THF (~5 mL) and then the solution of G1 (0.0104 g, $1.26 \cdot 10^{-5}$ mol) in THF (1 mL) was added to the solution of M3 (mole ratio [M]/[Ru]=200) with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Polymer 7 was dried under reduced pressure for 40 h at 35° C. (yield 94%).

Product Specification:

Polymer was quite rubbery and has pale pink color. It was soluble in THF, acetone, chloroform.

Example 30

Ring-Opening Metathesis Random Copolymerization of M2 and M1, [M2]/[M1]/[G1]=150/50/1

Scheme 30

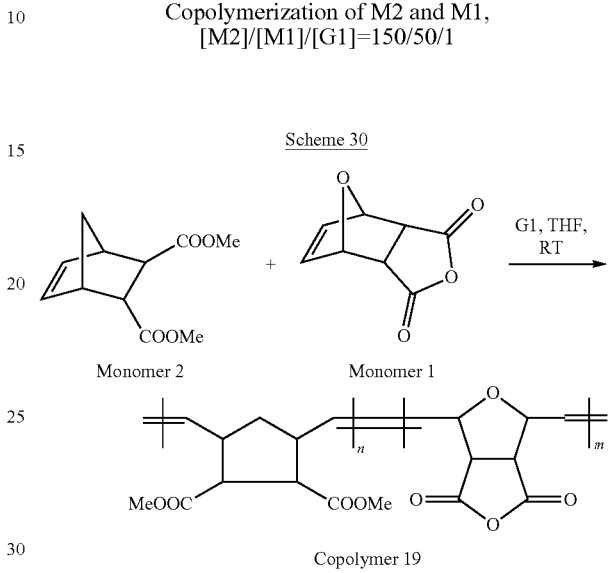

Monomer 2        Monomer 1

Copolymer 19

Procedure:

Mixture of M1 (0.044 g, $2.67 \cdot 10^{-4}$ mol) and M2 (0.17 g, $8.02 \cdot 10^{-4}$ mol) was dissolved in deoxygenated THF (~5 mL) and then the solution of G1 (0.0044 g, $5.34 \cdot 10^{-6}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Copolymer 19 was dried under reduced pressure for 40 h at 35° C. (yield 92% after second precipitation). $^1$H NMR measurements revealed the content in Copolymer 19 was 21% M1 and 79% M2.

Product Specification:

Copolymer 19 was pale yellow in color. It was soluble in THF, DMF, DCM and chloroform, and was soluble in ethanol or methanol if left for a long time.

Example 31

Ring-Opening Metathesis Random Copolymerization of M2 and M1, [M2]/[M1]/[G1]=100/100/1

Scheme 31

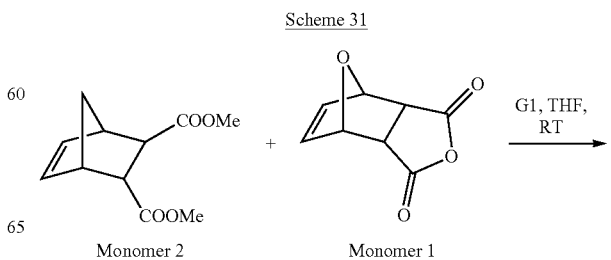

Monomer 2        Monomer 1

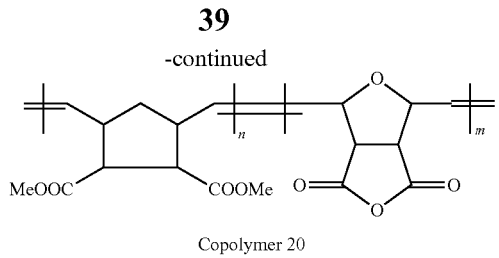

Copolymer 20

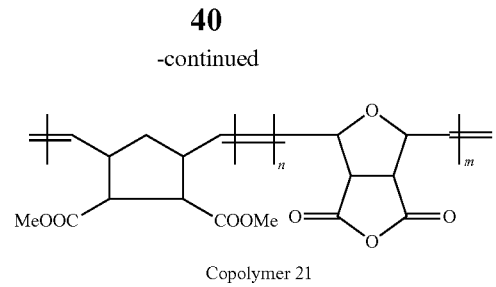

Copolymer 21

Procedure:

Mixture of M1 (0.088 g, 5.34·10⁻⁴ mol) and M2 (0.11 g, 5.34·10⁻⁴ mol) was dissolved in deoxygenated THF (~3 mL) and then the solution of G1 (0.0044 g, 5.34·10⁻⁶ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Copolymer 20 was dried under reduced pressure for 40 h at 35° C. (yield 95% after second precipitation). $^1$H NMR measurements showed the content in Copolymer 20 was 26% M1 and 74% M2.

Product Specification:

Copolymer 20 was pale yellow in color. It was soluble in THF, acetone and DMF, soluble in ethanol or methanol if left for a long time.

Procedure:

Mixture of M1 (0.13 g, 8.00·10⁻⁴ mol) and M2 (0.056 g, 2.67·10⁻⁴ mol) was dissolved in deoxygenated THF (~3 mL) and then the solution of G1 (0.0044 g, 5.34·10⁻⁶ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). Received Copolymer 21 was not soluble completely in THF after reprecipitation in to hexane. The product Copolymer 21 was dried under reduced pressure for 40 h at 35° C. (yield 94% after second precipitation). $^1$H NMR measurements revealed the content in Copolymer 21 was 51% M1 and 49% M2.

Product Specification:

Copolymer 21 was pale yellow in color. It was soluble in THF, acetone and DMF, and was soluble in ethanol or methanol if left for a long time.

Example 32

Ring-Opening Metathesis Random Copolymerization of M2 and M1, [M2]/[M1]/[G1]=50/150/1

Scheme 32

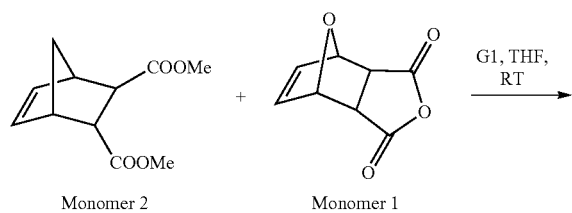

Monomer 2    Monomer 1

Example 33

Ring-Opening Metathesis Block Copolymerization of M2 and M1, [M2]/[M1]/[G1]=75/25/1

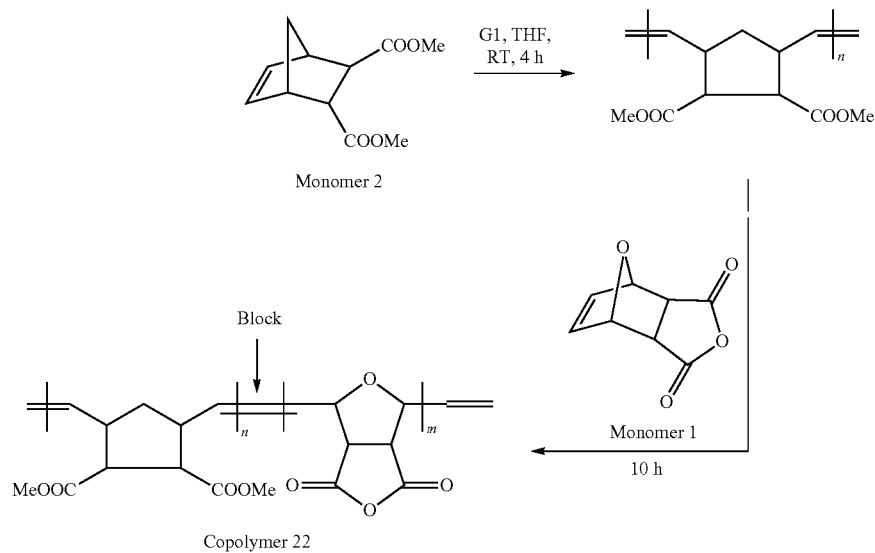

Copolymer 22

Procedure:

M2 (0.084 g, 4.01·10$^{-4}$ mol) was dissolved in deoxygenated THF (~5 mL) and then the solution of G1 (0.0044 g, 5.34·10$^{-6}$ mol) in THF (0.7 mL) was added to the solution of M2 with constant stirring. The reaction mixture was stirred for 4 h and then solution of M1 (0.022 g, 1.34·10$^{-4}$ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 22 was dried under reduced pressure for 40 h at 35° C. (yield 70% after the second precipitation). $^1$H NMR measurements showed the content in Copolymer 22 was 18% M1 and 82% M2.

Product Specification

Copolymer 22 was pale yellow in color. It was soluble in THF, DMF, DCM and chloroform, and was soluble in ethanol or methanol if left for a long time.

Example 34

Ring-Opening Metathesis Block Copolymerization of M2 and M1, [M2]/[M1]/[G1]=50/50/1

Procedure:

M2 (0.11 g, 5.34·10$^{-4}$ mol) was dissolved in deoxygenated THF (~5 mL) and then the solution of G1 (0.0044 g, 5.34·10$^{-6}$ mol) in THF (0.7 mL) was added to the solution of M2 with constant stirring. The reaction mixture was stirred for 4 h and then solution of M1 (0.088 g, 5.34·10$^{-4}$ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 23 was dried under reduced pressure for 40 h at 35° C. (yield 86% after the second precipitation). $^1$H NMR measurements revealed the content in Copolymer 23 was 41% M1 and 59% M2.

Product Specification

Copolymer 23 was pale yellow in color. It was soluble in THF, DMF and acetone. It was soluble in ethanol or methanol if left for a long time.

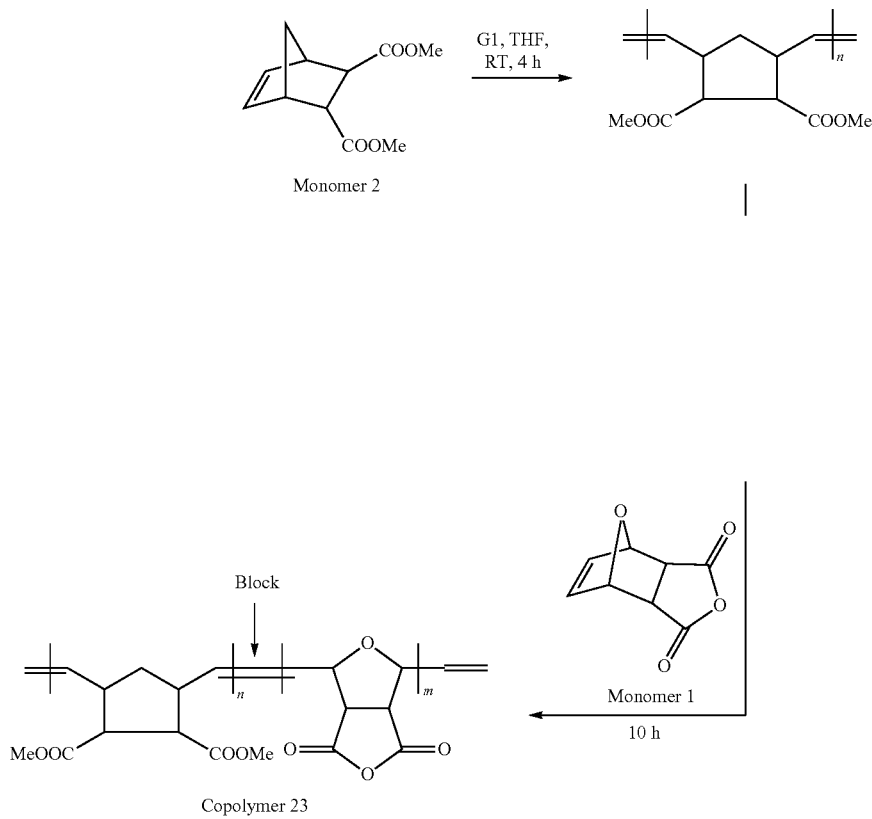

Example 35

Ring-Opening Metathesis Block Copolymerization of M2 and M1, [M2]/[M1]/[G1]=25/75/1

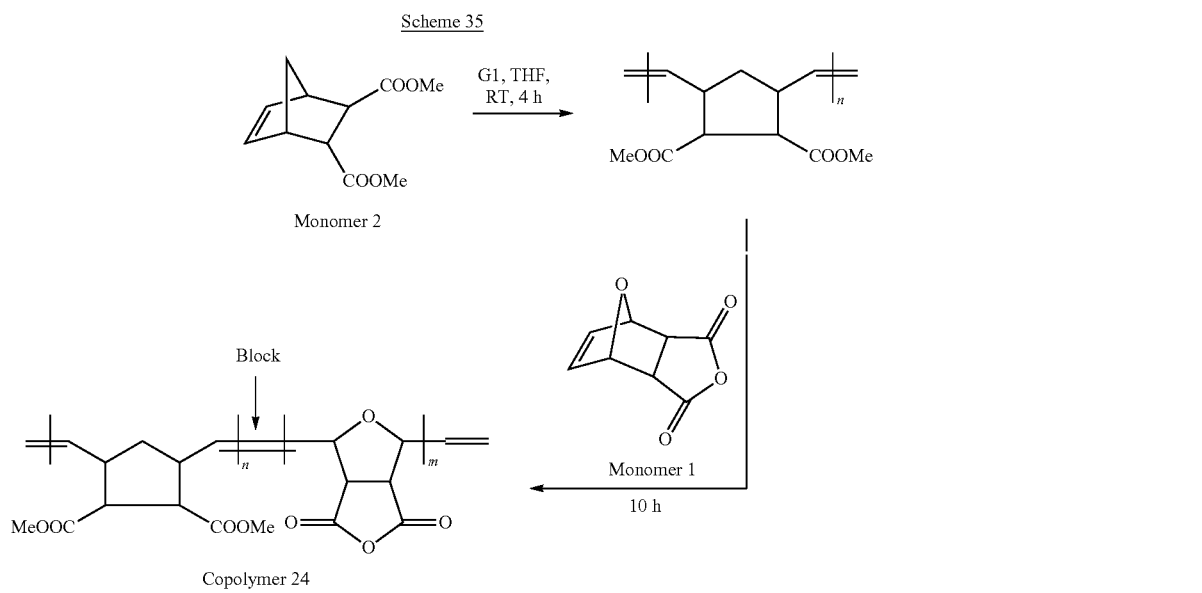

Scheme 35

Copolymer 24

Procedure:

M2 (0.028 g, 1.34·10⁻⁴ mol) was dissolved in deoxygenated THF (~10 mL) and then the solution of G1 (0.0044 g, 5.34·10⁻⁶ mol) in THF (0.7 mL) was added to the solution of M2 with constant stirring. The reaction mixture was stirred for 4 h and then solution of M1 (0.066 g, 4.01·10⁻⁴ mol) in THF was added dropwise. The reaction mixture was stirred during for 10 h. The gel was formed during the reaction. The reaction was stopped by adding of vinylethyl ether (0.1 mL) and stirring for 30 min. The polymer was precipitated into hexane (10-fold excess) containing hydroquinone (around 0.1 g as an inhibitor). The product Copolymer 24 was dried under reduced pressure for 40 h at 35° C. (yield 92%). ¹H NMR revealed the content in Copolymer 24 was 66% M1 and 34% M2.

Product Specification

Copolymer 24 was pale yellow in color. It was insoluble in THF, DMF, DCM and chloroform.

Example 36

Ring-Opening Metathesis Block Copolymerization of M2 and M3, [M2]/[M3]/[G1]=50/50/1

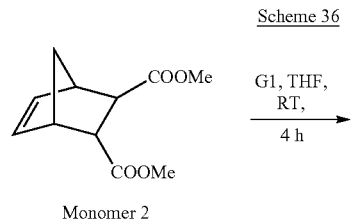

Scheme 36

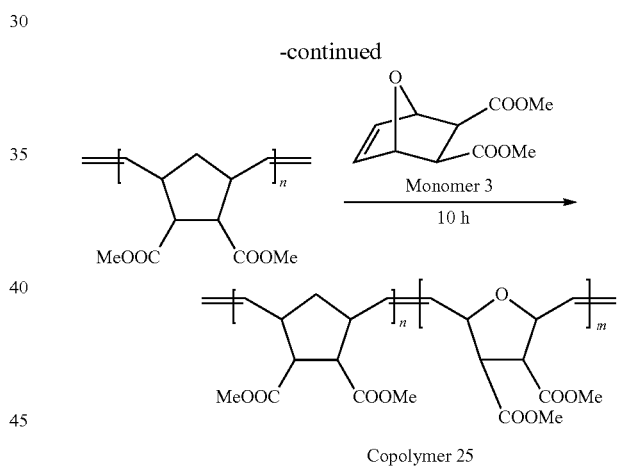

Copolymer 25

Procedure:

M2 (0.056 g, 2.67·10⁻⁴ mol) was dissolved in deoxygenated THF (~5 mL) and then the solution of G1 (0.0044 g, 5.34·10⁻⁶ mol) in THF (0.7 mL) was added to the solution of M2 with constant stirring. The reaction mixture was stirred for 4 h and then solution of M3 (0.056 g, 2.67·10⁻⁴ mol) in THF was added dropwise. The reaction mixture was stirred during for 10 h and then stopped by adding of vinylethyl ether (0.1 mL) and stirring for 30 min. The polymer was precipitated into hexane (10-fold excess) containing hydroquinone (around 0.1 g as an inhibitor). The product Copolymer 25 was dried under reduced pressure for 40 h at 35° C. (yield 96% after the second precipitation). ¹H NMR revealed the content in Copolymer 25 was 53% M2 and 47% M3.

Product Specification

Copolymer 25 was pale yellow in color. It was soluble in THF, DMF, DCM and chloroform.

Example 37

Ring-Opening Metathesis Polymerization (ROMP) and Copolymerization (ROMCP) in the Presence of Grubbs Ruthenium Initiator 2nd Generation (G2)

Materials for all ROMP and ROMCP Reactions in the Presence of G2 Initiator:

Grubbs ruthenium initiator 2nd generation (G2, Aldrich), hydroquinone (Aldrich) and hexane (Fisher) were used as received. TI-IF (Fisher) was deoxygenated before use. Monomer 1, Monomer 2 and Monomer 3 were obtained as described above. The reactions were carried out under a nitrogen atmosphere.

ROMP of Monomer 1 (M1)

Scheme 37

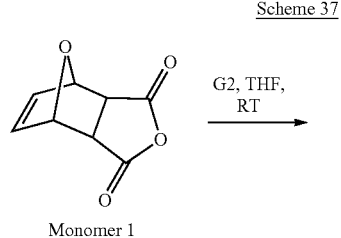

Monomer 1

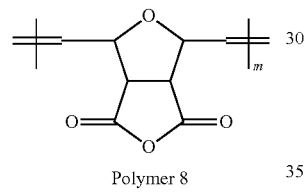

Polymer 8

Procedure:

M1 (1 g, 0.006 mol) was dissolved in deoxygenated THF (~10 mL) and then the solution of G2 (0.051 g, 6.02·10$^{-5}$ mol) in THF (1 mL) was added to the solution of M1 (mole ratio [M]/[Ru]=100) with constant stirring. The reaction was stopped after 12 h by adding of vinylethyl ether (0.1 mL) and stirring for 30 min. Polymer 8 was precipitated into hexane (10-fold excess) containing hydroquinone (around 0.1 g as an inhibitor). The product Polymer 8 was dried under reduced pressure for 40 h at 35° C. (yield 97% after the second re-precipitation).

Product Specification:

Polymer 8 was pale yellow in color. It was soluble in THF and DMF, and was soluble in ethanol if left for a long time.

Example 38

ROMP of Monomer 2 (M2)

Scheme 38

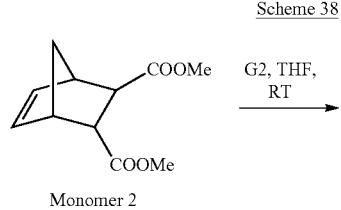

Monomer 2

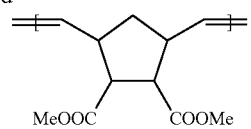

Polymer 9

Procedure:

M2 (0.64 g, 0.003 mol) was dissolved in deoxygenated THF (~5 mL) and then the solution of G2 (0.025 g, 3.0·10$^{-5}$ mol) in THF (1 mL) was added to the solution of M2 (mole ratio [M]/[Ru]=100) with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Polymer 9 was dried under reduced pressure for 40 h at 35° C. (yield 92%).

Product Specification:

Polymer 9 was quite rubbery and has pale pink color. It was soluble in THF, acetone, and chloroform.

Example 39

ROMP of Monomer 3 (M3)

Scheme 39

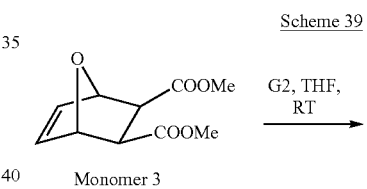

Monomer 3

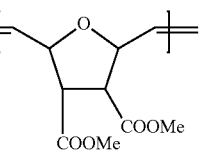

Polymer 10

Procedure:

M3 (0.53 g, 0.0025 mol) was dissolved in deoxygenated THF (~5 mL) and then the solution of G2 (0.021 g, 2.5·10$^{-5}$ mol) in THF (1 mL) was added to the solution of M3 (mole ratio [M]/[Ru]=100) with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Polymer 10 was dried under reduced pressure for 40 h at 35° C. (yield 97%).

Product Specification:

Polymer 10 was quite rubbery and has pale pink color. It was soluble in THF, acetone, and chloroform.

Example 40

Ring-Opening Metathesis Random
Copolymerization of M2 and M1,
[M2]/[M1]/[G2]=75/25/1

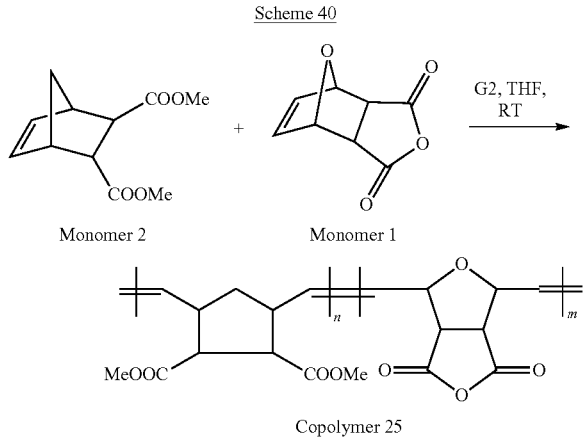

Scheme 40

Copolymer 25

Procedure:

Mixture of M1 (0.07 g, $4.5 \cdot 10^{-4}$ mol) and M2 (0.19 g, $8.85 \cdot 10^{-4}$ mol) was dissolved in deoxygenated THF (~10 mL) and then the solution of G2 (0.01 g, $1.18 \cdot 10^{-5}$ mol) in THF (0.7 mL) was added to the solution of monomers mixture with constant stirring. The reaction was stopped after 12 h by adding of vinylethyl ether (0.1 mL) and stirring for 30 min. The copolymer was precipitated into hexane (10-fold excess) containing hydroquinone (around 0.1 g as an inhibitor). The product Copolymer 25 was dried under reduced pressure for 40 h at 35° C. (yield 94% after second precipitation). $^1$H NMR revealed the content in Copolymer 25 was 44% M1 and 56% M2.

Product Specification:

Copolymer 25 was pale yellow in color. It was soluble in THF, DMF, DCM and chloroform, and was soluble in ethanol or methanol if left for a long time.

Example 41

Ring-Opening Metathesis Random
Copolymerization of M2 and M1,
[M2]/[M1]/[G2]=50/50/1

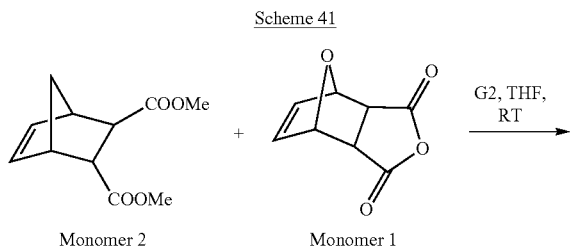

Scheme 41

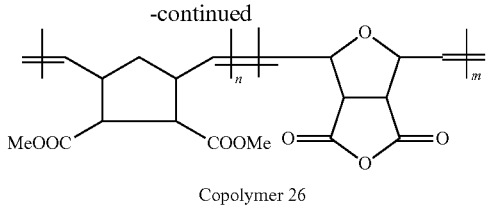

Copolymer 26

Procedure:

Mixture of M1 (0.098 g, $5.9 \cdot 10^{-4}$ mol) and M2 (0.125 g, $5.9 \cdot 10^{-4}$ mol) was dissolved in deoxygenated THF (~10 mL) and then the solution of G2 (0.01 g, $1.18 \cdot 10^{-5}$ mol) in THF (0.7 mL) was added to the solution of monomers mixture with constant stirring. The reaction was stopped after 12 h by adding of vinylethyl ether (0.1 mL) and stirring for 30 min. The copolymer was precipitated into hexane (10-fold excess) containing hydroquinone (around 0.1 g as an inhibitor). The product Copolymer 26 was dried under reduced pressure for 40 h at 35° C. (yield 95% after second precipitation). $^1$H NMR revealed the content in Copolymer 26 was 42% M1 and 58% M2.

Product Specification:

Copolymer 26 was pale yellow in color. It was soluble in THF, acetone and DMF, and was soluble in ethanol or methanol if left for a long time.

Example 42

Ring-Opening Metathesis Random
Copolymerization of M2 and M1,
[M2]/[M1]/[G2]=25/75/1

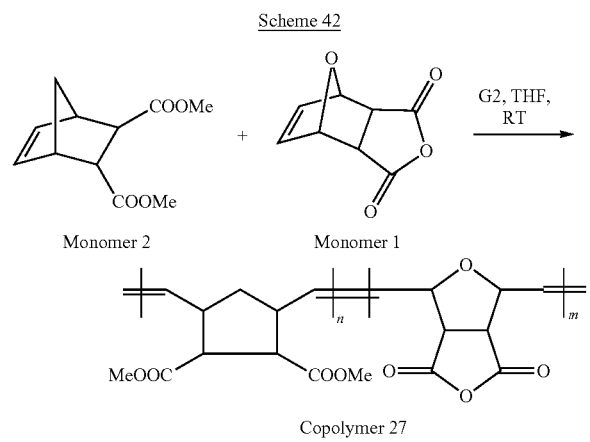

Scheme 42

Copolymer 27

Procedure:

Mixture of M1 (0.147 g, $8.85 \cdot 10^{-4}$ mol) and M2 (0.062 g, $2.95 \cdot 10^{-4}$ mol) was dissolved in deoxygenated THF (~5 mL) and then the solution of G2 (0.01 g, $1.18 \cdot 10^{-5}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). Received Copolymer 27 was not soluble completely in THF after reprecipitation in to hexane. The product Copolymer 27 was dried under reduced pressure for 40 h at 35° C. (yield 98% after second precipitation). $^1$H NMR revealed the content in Copolymer 27 was 82% M1 and 18% M2.

Product Specification:

Copolymer 27 was pale yellow in color. It was soluble in THF, acetone and DMF, and was soluble in ethanol or methanol if left for a long time.

Example 43

Ring-Opening Metathesis Random Copolymerization of M3 and M1, [M3]/[M1]/[G2]=75/25/1

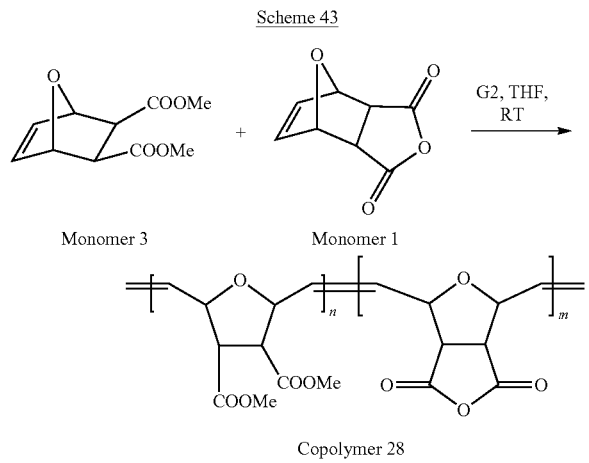

Scheme 43

Copolymer 28

Procedure:

Mixture of M1 (0.07 g, 4.5·10$^{-4}$ mol) and M3 (0.19 g, 8.85·10$^{-4}$ mol) was dissolved in deoxygenated THF (~5 mL) and then the solution of G2 (0.01 g, 1.18·10$^{-5}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Copolymer 28 was dried under reduced pressure for 40 h at 35° C. (yield 95% after second precipitation). The chemical shifts of two monomer units were overlapping and hence difficult to define the composition by $^1$H NMR.

Product Specification:

Copolymer 28 was pale yellow in color. It was soluble in THF, DMF, DCM and chloroform, and was soluble in ethanol or methanol if left for a long time.

Example 44

Ring-Opening Metathesis Random Copolymerization of M3 and M1, [M3]/[M1]/[G2]=50/50/1

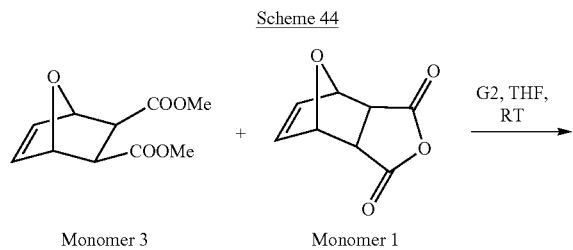

Scheme 44

-continued

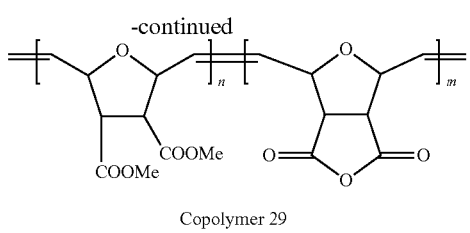

Copolymer 29

Procedure

Mixture of M1 (0.098 g, 5.88·10$^{-4}$ mol) and M3 (0.124 g, 5.88·10$^{-4}$ mol) was dissolved in deoxygenated THF (~5 mL) and then the solution of G2 (0.01 g, 1.17·10$^{-5}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). The product Copolymer 29 was dried under reduced pressure for 40 h at 35° C. (yield 93% after second precipitation). The chemical shifts of two monomer units were overlapping and hence difficult to define the composition by $^1$H NMR.

Product Specification:

Copolymer 29 was pale yellow in color. It was soluble in THF, acetone and DMF, and was soluble in ethanol or methanol if left for a long time.

Example 45

Ring-Opening Metathesis Random Copolymerization of M3 and M1, [M3]/[M1]/[G2]=25/75/1

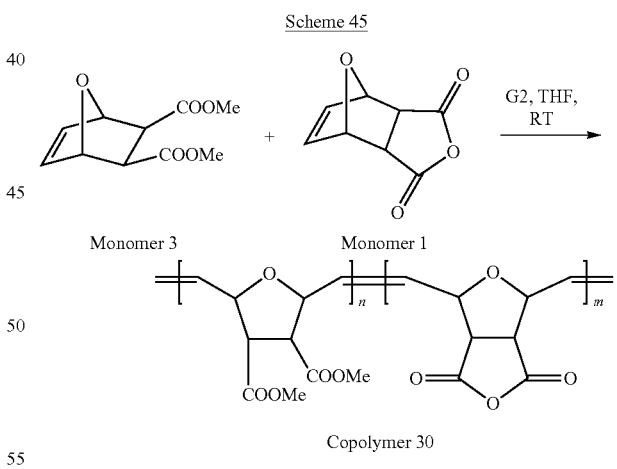

Scheme 45

Copolymer 30

Procedure:

Mixture of M1 (0.147 g, 8.85·10$^{-4}$ mol) and M3 (0.062 g, 2.95·10$^{-4}$ mol) was dissolved in deoxygenated THF (~5 mL) and then the solution of G2 (0.01 g, 1.18·10$^{-5}$ mol) in THF (0.7 mL) was added to the solution of monomers mixture with constant stirring. The reaction was stopped after 12 h by adding of vinylethyl ether (0.1 mL) and stirring for 30 min. The polymer was precipitated into hexane (10-fold excess) containing hydroquinone (around 0.1 g as an inhibitor). Received Copolymer 30 was not soluble completely in THF after reprecipitation in to hexane. The product Copolymer 30 was dried under reduced pressure for 40 h at 35° C. (yield 97% after second precipitation). The chemical shifts of two monomer units were overlapping and hence difficult to define the composition by $^1$H NMR.

Product Specification:

Copolymer 30 was pale yellow in color.

Example 46

Ring-Opening Metathesis Random Copolymerization of M3 and M2, [M3]/[M2]/[G2]=50/50/1

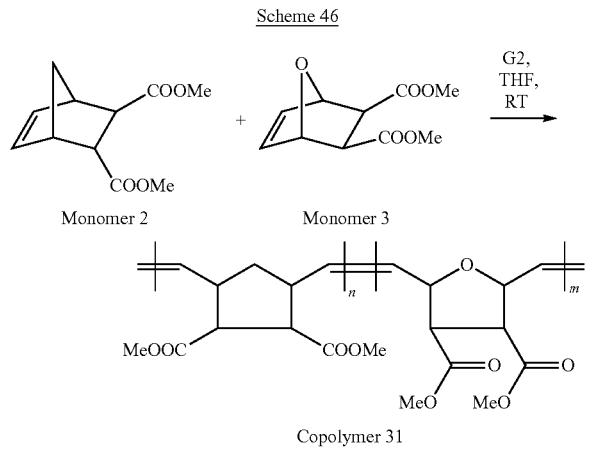

Procedure:

Mixture of M2 (0.123 g, 5.9·10$^{-4}$ mol) and M3 (0.125 g, 5.9·10$^{-4}$ mol) was dissolved in deoxygenated THF (~6 mL) and then the solution of G2 (0.0044 g, 4.76·10$^{-6}$ mol) in THF (0.7 mL) was added to the solution of monomers mixture with constant stirring. The reaction was stopped after 12 h by adding of vinylethyl ether (0.1 mL) and stirring for 30 min. The Copolymer 31 was precipitated into hexane (10-fold excess) containing hydroquinone (around 0.1 g as an inhibitor). The product Copolymer 31 was dried under reduced pressure for 40 h at 35° C. (yield 98% after second precipitation). The chemical shifts of two monomer units were overlapping and hence difficult to define the composition by 1H NMR.

Product Specification:

Copolymer 31 was pale yellow in color. It was soluble in THF, acetone, chloroform, dichloromethane and DMF.

Example 47

Hydrogenation of Synthesized Homo- and Copolymers

Materials for all Hydrogenation Reactions:

Polymers and copolymers were synthesized as described above, p-toluene sulphonylhydrazide (p-TSH, Aldrich), DMF (Aldrich).

Hydrogenation of Copolymer 2

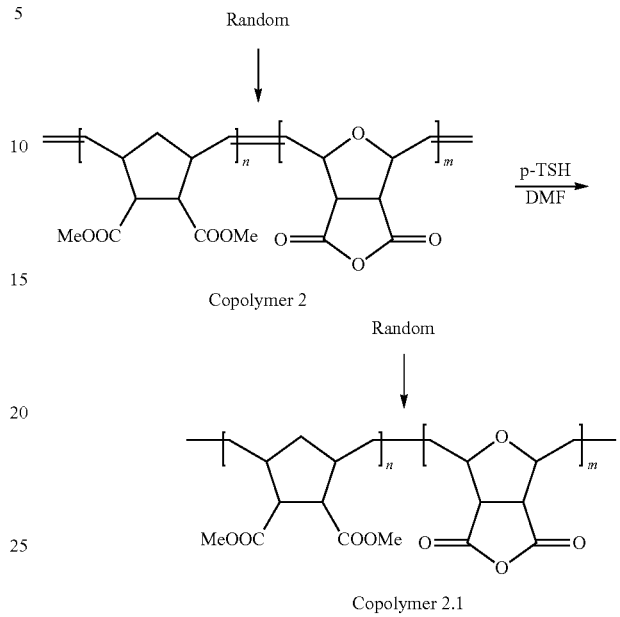

Procedure:

Copolymer 2 (0.2 g, 9.52·10$^{-4}$ mol), p-TSH (0.02 g, 1.19·10$^{-4}$ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 96%) was a yellowish powder insoluble in DMF.

Example 48

Hydrogenation of Copolymer 5

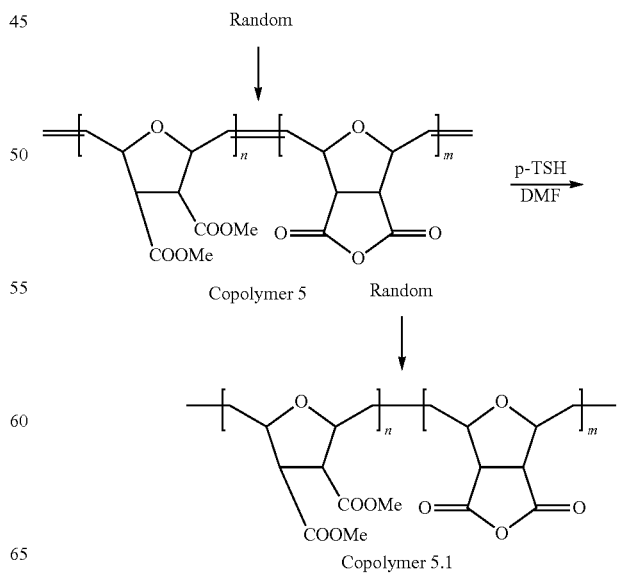

53

Procedure:

Copolymer 5 (0.2 g, 9.52·10$^{-4}$ mol), p-TSH (0.02 g, 1.19·10$^{-4}$ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 93%) was a yellowish powder insoluble in DMF.

Example 49

Hydrogenation of Copolymer 8

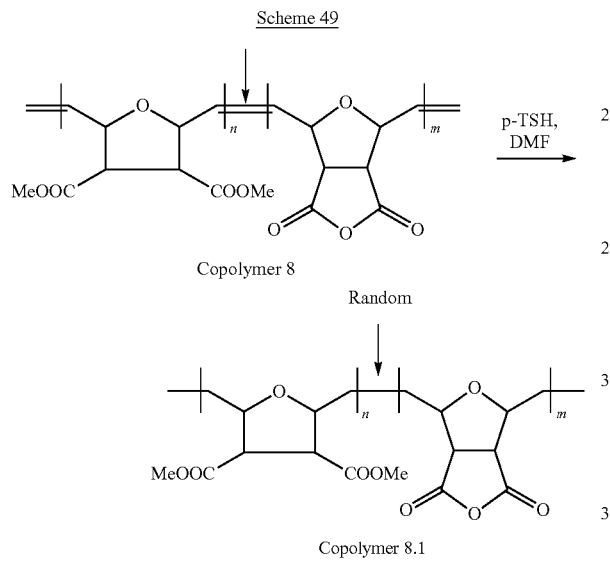

Procedure:

Copolymer 8 (0.2 g, 9.52·10$^{-4}$ mol), p-TSH (0.02 g, 1.19·10$^{-4}$ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 93%) was a yellowish powder insoluble in DMF.

Example 50

Hydrogenation of Copolymer 11

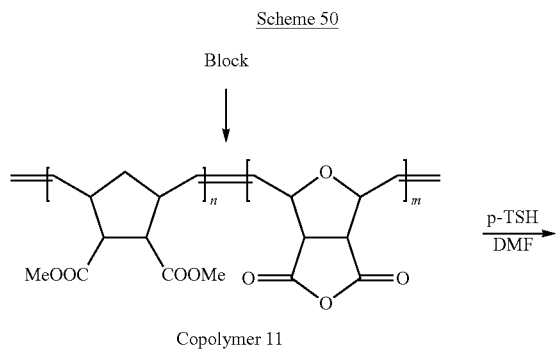

-continued

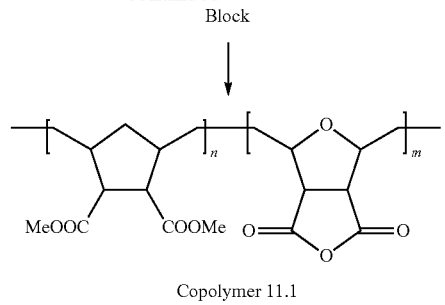

Copolymer 11.1

Procedure:

Copolymer 11 (0.2 g, 9.52·10$^{-4}$ mol), p-TSH (0.02 g, 1.19·10$^{-4}$ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 97%) was a yellowish powder insoluble in DMF.

Example 51

Hydrogenation of Copolymer 14

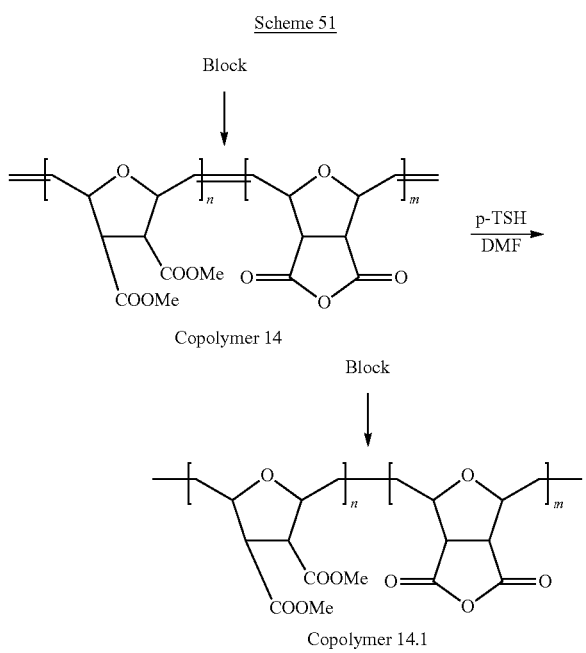

Procedure:

Copolymer 14 (0.2 g, 9.52·10$^{-4}$ mol), p-TSH (0.02 g, 1.19·10$^{-4}$ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 93%) was a yellowish powder insoluble in DMF.

Example 52

Hydrogenation of Copolymer 17

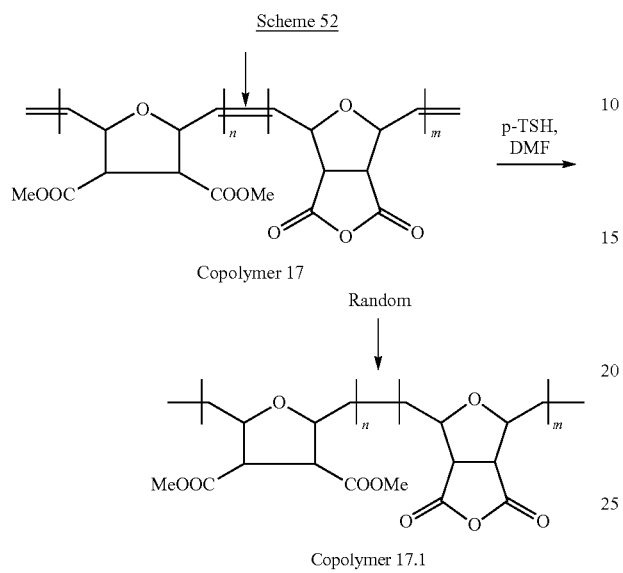

Scheme 52

Copolymer 17

Copolymer 17.1

Procedure:
Copolymer 17 (0.2 g, 9.52·10⁻⁴ mol), p-TSH (0.02 g, 1.19·10⁻⁴ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 93%) was a yellowish powder insoluble in DMF.

Example 53

Hydrogenation of Polymer 8

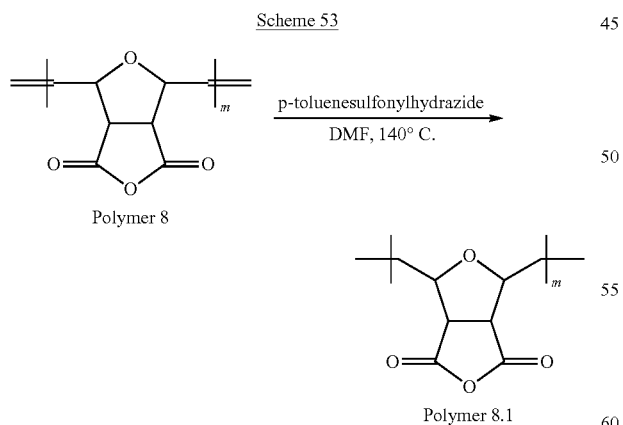

Scheme 53

Polymer 8

Polymer 8.1

Procedure:
Polymer 8 (0.2 g, 1.2·10⁻³ mol), p-TSH (1.12 g, 6.02·10⁻³ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 96%) was a yellowish powder insoluble in DMF.

Example 54

Hydrogenation of Copolymer 26

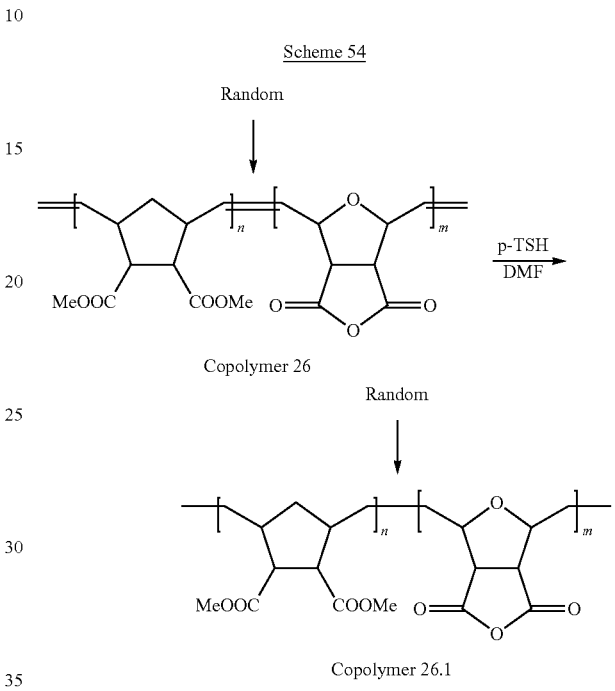

Scheme 54

Copolymer 26

Copolymer 26.1

Procedure:
Copolymer 26 (0.2 g, 9.52·10⁻⁴ mol), p-TSH (0.89 g, 4.76·10⁻³ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 96%) was a yellowish powder insoluble in DMF.

Example 55

Hydrogenation of Copolymer 29

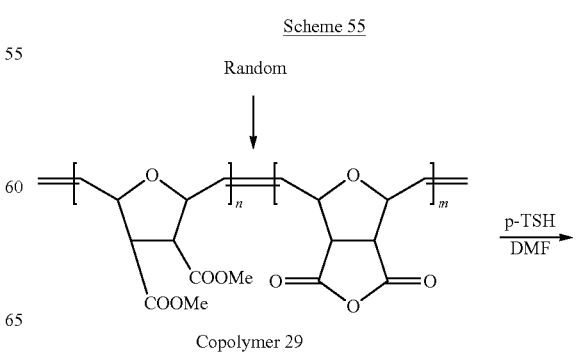

Scheme 55

Copolymer 29

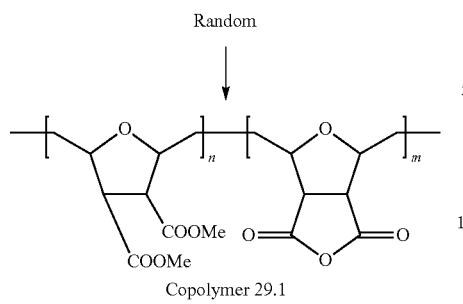

Copolymer 29.1

Procedure:

Copolymer 29 (0.2 g, 9.52·10⁻⁴ mol), p-TSH (0.89 g, 4.76·10⁻³ mol) and DMF (5 mL) were placed in a one necked, round bottomed flask (50 mL) fitted with a condenser and stirrer bar and then heated with stirring to 140° C. for 12 h. The hot solution was added dropwise to vigorously stirring methanol (150 mL) to give a precipitate, which was isolated by filtration. The resulting polymer (yield 96%) was a yellowish powder insoluble in DMF.

Example 56

Base Hydrolysis of Synthesized Polymers and Copolymers

Materials for all Base Hydrolysis Reactions:

NaOH (Aldrich) was used as received. Demineralized water was supplied from the Department. Copolymer 1-Copolymer 13 were obtained as described above. The reactions were carried out on the air.

Base Hydrolysis of Polymer 4

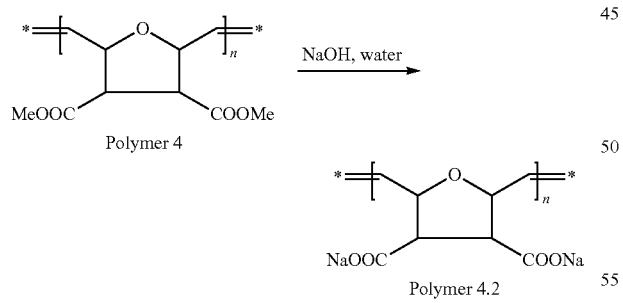

Procedure:

NaOH (0.065 g, 1.61·10⁻³ mol) was dissolved in water (5 mL) and added to a flask containing solid Polymer 4 (0.17 g, 8.09·10⁻⁴ mol) and stirred 2 h. At the start the Polymer 4 was floated on the surface but eventually dissolved in the water as the reaction proceeded with time. The color of the solution during the reaction changed from colorless to white. Polymer 4.2 was kept in the solution. Alternatively, Polymer 4.2 can be precipitated in ethanol and dried under reduced pressure.

Example 57

Base Hydrolysis of Copolymer 1

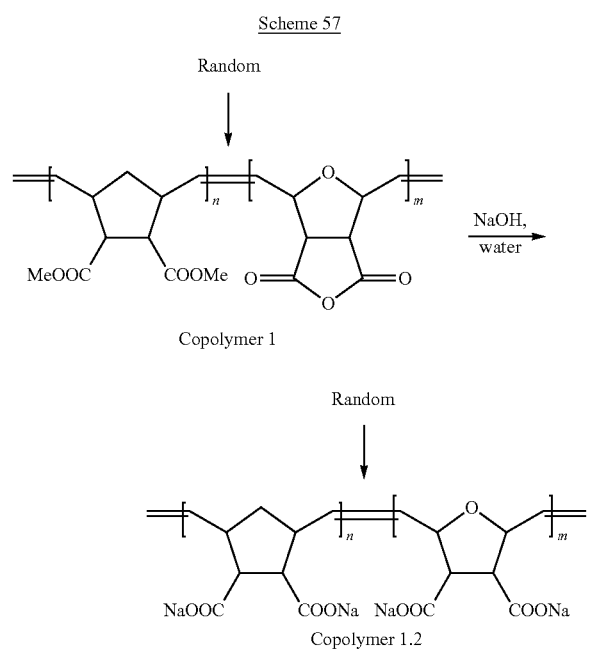

Procedure:

NaOH (0.065 g, 1.6110 mol) was dissolved in water (5 mL) and added to a flask containing solid Copolymer 1 (0.17 g, 8.09·10⁻⁴ mol) and stirred 2 h. At the start the Copolymer 1 was floated on the surface but eventually dissolved in the water as the reaction proceeded with time. The color of the solution during the reaction changed from colorless to greenish. Copolymer 1.2 was kept in the solution. Alternatively, Copolymer 1.2 can be precipitated in ethanol and dried under reduced pressure.

Example 58

Base Hydrolysis of Copolymer 2

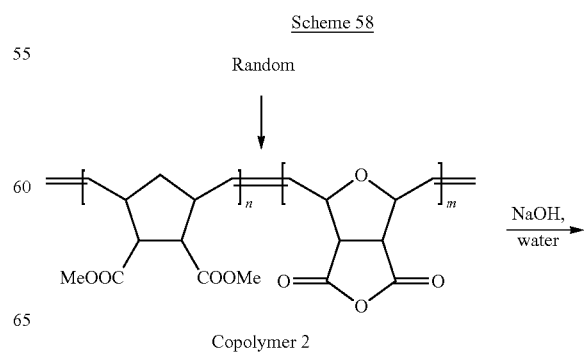

-continued

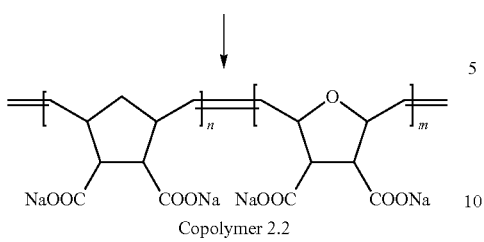

Copolymer 2.2

Procedure:

NaOH (0.065 g, 1.61·10$^{-3}$ mol) was dissolved in water (5 mL) and added to a flask containing solid Copolymer 2 (0.17 g, 8.09 10 mol) and stirred 2 h. At the start the Copolymer 2 was floated on the surface but eventually dissolved in the water as the reaction proceeded with time. The color of the solution during the reaction changed from colorless to greenish. Copolymer 2.2 was kept in the solution. Alternatively, Copolymer 2.2 can be precipitated in ethanol and dried under reduced pressure.

Example 59

Base Hydrolysis of Copolymer 3

Scheme 59

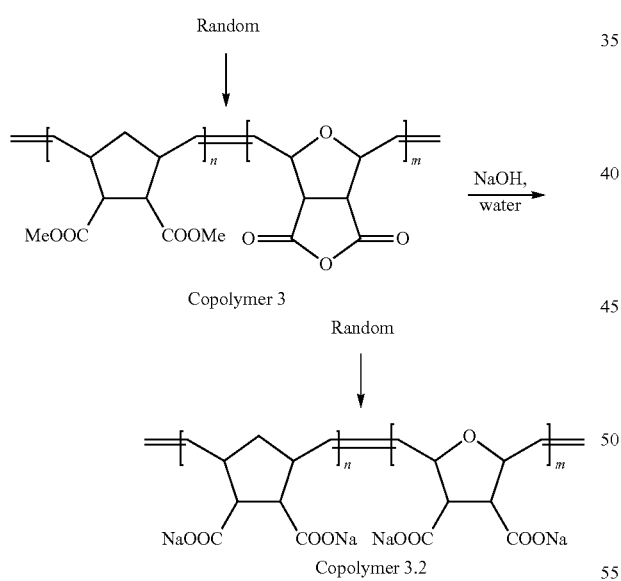

Procedure:

NaOH (0.065 g, 1.61·10$^{-3}$ mol) was dissolved in water (5 mL) and added to a flask containing solid Copolymer 3 (0.17 g, 8.09·10$^{-4}$ mol) and stirred 2 h. At the start the Copolymer 3 was floated on the surface but eventually dissolved in the water as the reaction proceeded with time. The color of the solution during the reaction changed from colorless to greenish. Copolymer 3.2 was kept in the solution. Alternatively, Copolymer 3.2 can be precipitated in ethanol and dried under reduced pressure (yield 98% after precipitation).

Example 60

Base Hydrolysis of Copolymer 4

Scheme 60

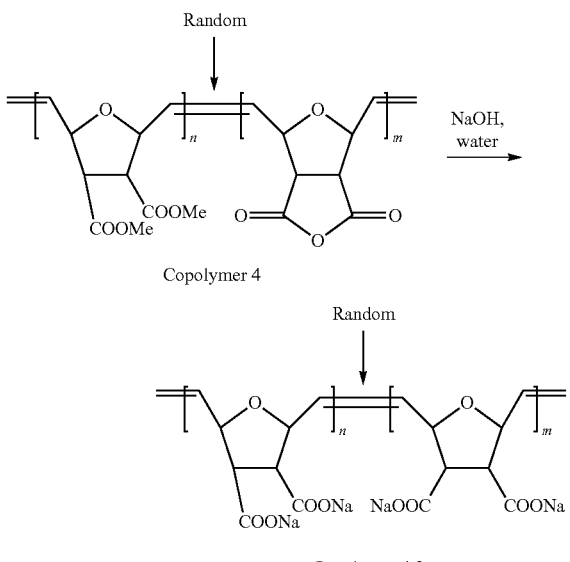

Procedure:

NaOH (0.065 g, 1.61·10$^{-4}$ mol) was dissolved in water (5 mL) and added to a flask containing solid Copolymer 4 (0.17 g, 8.09·10$^{-4}$ mol) and stirred 2 h. At the start the Copolymer 4 was floated on the surface but eventually dissolved in the water as the reaction proceeded with time. The color of the solution during the reaction changed from colorless to greenish. Copolymer 4.2 was kept in the solution. Alternatively, Copolymer 4.2 can be precipitated in ethanol and dried under reduced pressure.

Example 61

Base Hydrolysis of Copolymer 5

Scheme 61

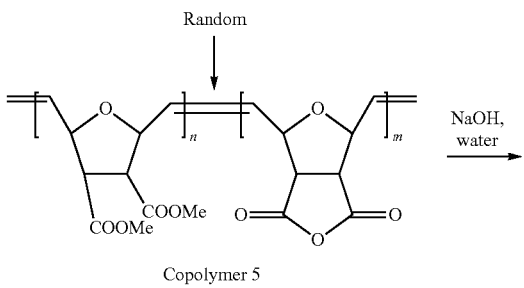

Copolymer 5

-continued

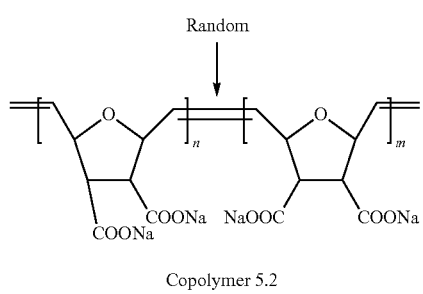

Copolymer 5.2

Procedure:

NaOH (0.065 g, 1.61·10⁻³ mol) was dissolved in water (5 mL) and added to a flask containing solid Copolymer 5 (0.17 g, 8.09·10⁻⁴ mol) and stirred 2 h. At the start the Copolymer 5 was floated on the surface but eventually dissolved in the water as the reaction proceeded with time. The color of the solution during the reaction changed from colorless to greenish. Copolymer 5.2 was kept in the solution. Alternatively, Copolymer 5.2 can be precipitated in ethanol and dried under reduced pressure.

Example 62

Base Hydrolysis of Copolymer 6

Scheme 62

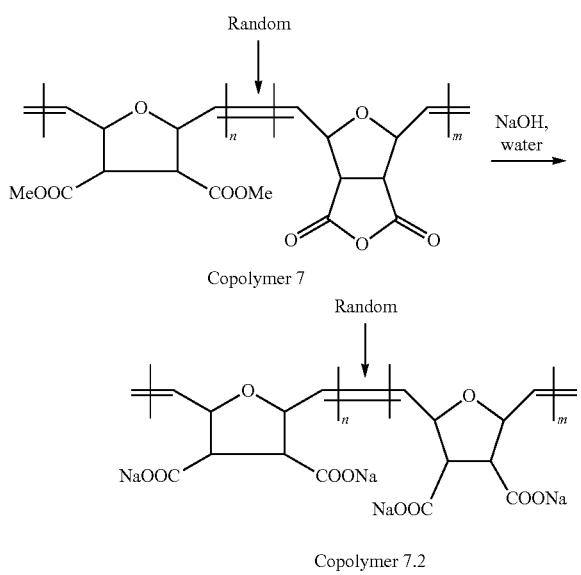

Copolymer 6.2

Procedure:

NaOH (0.065 g, 1.61·10⁻⁴ mol) was dissolved in water (5 mL) and added to a flask containing solid Copolymer 6 (0.17 g, 8.09·10⁻⁴ mol) and stirred 2 h. At the start the Copolymer 6 was floated on the surface but eventually dissolved in the water as the reaction proceeded with time. The color of the solution during the reaction changed from colorless to greenish. Copolymer 6.2 was kept in the solution. Alternatively, Copolymer 6.2 can be precipitated in ethanol and dried under reduced pressure.

Example 63

Base Hydrolysis of Copolymer 7

Scheme 63

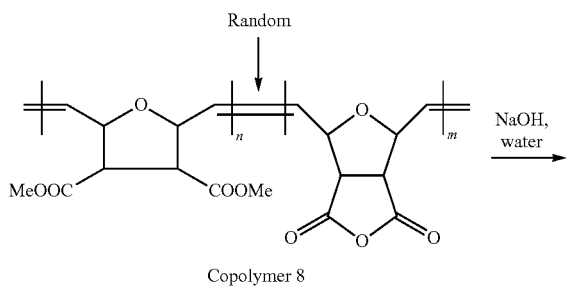

Copolymer 7.2

Procedure:

NaOH (0.065 g, 1.61·10⁻³ mol) was dissolved in water (5 mL) and added to a flask containing solid Copolymer 7 (0.17 g, 8.09·10⁻⁴ mol) and stirred 2 h. At the start the Copolymer 7 was floated on the surface but eventually dissolved in the water as the reaction proceeded with time. The color of the solution during the reaction changed from colorless to greenish. Copolymer 7.2 was kept in the solution. Alternatively, Copolymer 7.2 can be precipitated in ethanol and dried under reduced pressure.

Example 64

Base Hydrolysis of Copolymer 8

Scheme 64

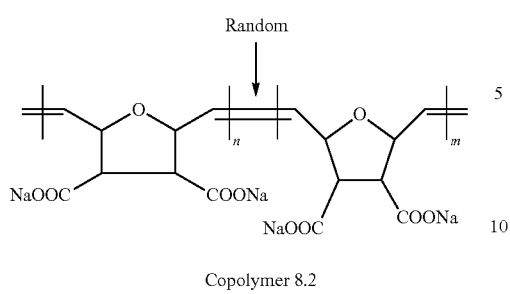

Copolymer 8.2

Procedure:

NaOH (0.065 g, $1.61 \cdot 10^{-3}$ mol) was dissolved in water (5 mL) and added to a flask containing solid Copolymer 8 (0.17 g, $8.09 \cdot 10^{-4}$ mol) and stirred 2 h. At the start the Copolymer 8 was floated on the surface but eventually dissolved in the water as the reaction proceeded with time. The color of the solution during the reaction changed from colorless to greenish. Copolymer 8.2 was kept in the solution. Alternatively, Copolymer 8.2 can be precipitated in ethanol and dried under reduced pressure.

Example 65

Base Hydrolysis of Copolymer 9

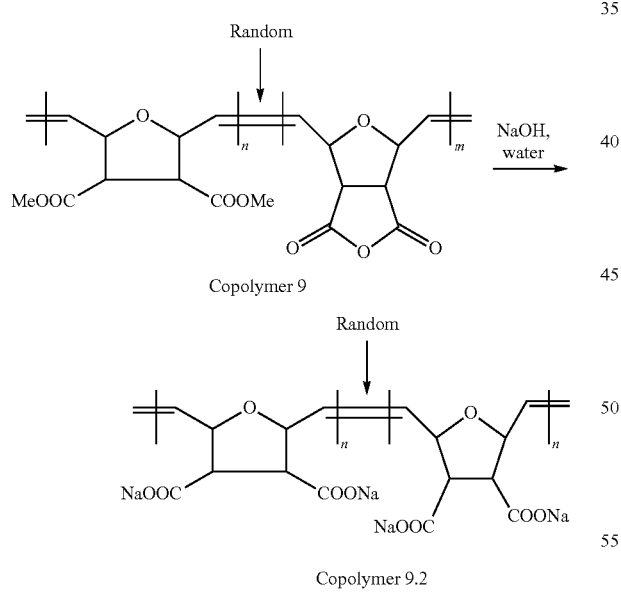

Copolymer 9.2

Procedure:

NaOH (0.065 g, $1.61 \cdot 10^{-3}$ mol) was dissolved in water (5 mL) and added to a flask containing solid Copolymer 9 (0.17 g, $8.09 \cdot 10^{-4}$ mol) and stirred 2 h. At the start the Copolymer 9 was floated on the surface but eventually dissolved in the water as the reaction proceeded with time. The color of the solution during the reaction changed from colorless to greenish. Copolymer 9.2 was kept in the solution. Alternatively, Copolymer 9.2 can be precipitated in ethanol and dried under reduced pressure.

Example 66

Base Hydrolysis of Copolymer 10

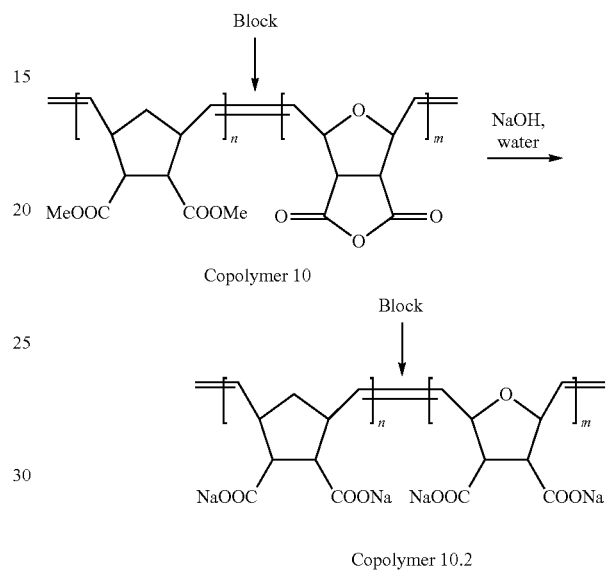

Copolymer 10.2

Procedure:

NaOH (0.065 g, $1.61 \cdot 10^{-3}$ mol) was dissolved in water (5 mL) and added to a flask containing solid Copolymer 10 (0.17 g, $8.09 \cdot 10^{-4}$ mol) and stirred 10 h. At the start the Copolymer 10 was floated on the surface, then formed a gel but eventually dissolved in the water as the reaction proceeded with time. The color of the solution during the reaction changed from colorless to greenish. Copolymer 10.2 was kept in the solution. Alternatively, Copolymer 10.2 can be precipitated in ethanol and dried under reduced pressure.

Example 67

Base Hydrolysis of Copolymer 11

Scheme 67

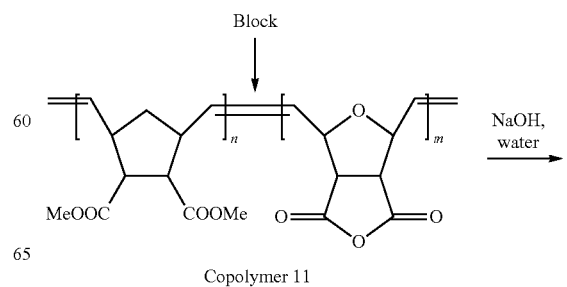

Copolymer 11

-continued

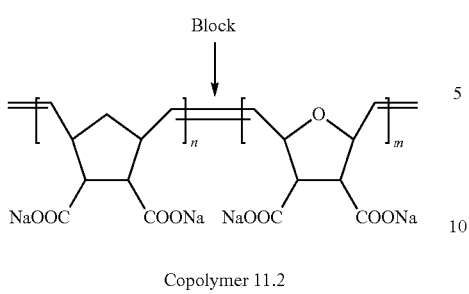

Copolymer 11.2

Procedure:

NaOH (0.065 g, 1.61·10$^{-3}$ mol) was dissolved in water (5 mL) and added to a flask containing solid Copolymer 11 (0.17 g, 8.09·10$^{-4}$ mol) and stirred 10 h. At the start the Copolymer 11 was floated on the surface, then formed a gel but eventually dissolved in the water as the reaction proceeded with time. The color of the solution during the reaction changed from colorless to greenish. Copolymer 11.2 was kept in the solution. Alternatively, Copolymer 11.2 can be precipitated in ethanol and dried under reduced pressure.

Example 68

Base Hydrolysis of Copolymer 12

Scheme 68

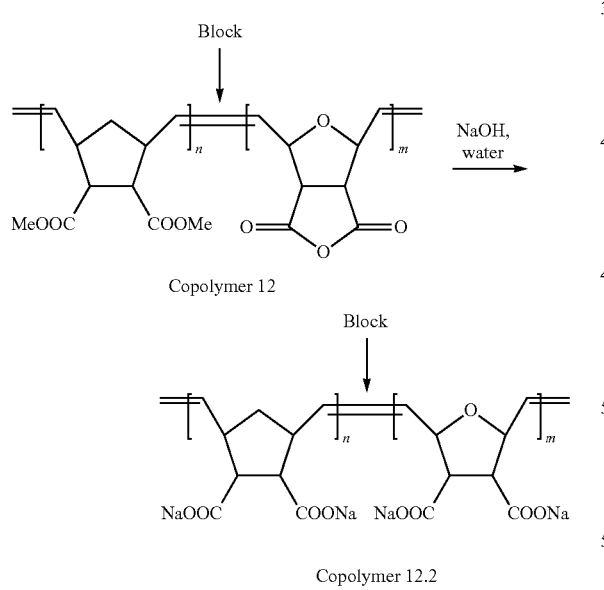

Copolymer 12

Copolymer 12.2

Procedure:

NaOH (0.065 g, 1.61·10$^{-3}$ mol) was dissolved in water (5 mL) and added to a flask containing solid Copolymer 12 (0.17 g, 8.09·10$^{-4}$ mol) and stirred 10 h. At the start the Copolymer 12 was floated on the surface, then formed a gel but eventually dissolved in the water as the reaction proceeded with time. The color of the solution during the reaction changed from colorless to greenish. Copolymer 12.2 was kept in the solution. Alternatively, Copolymer 12.2 can be precipitated in ethanol and dried under reduced pressure.

Example 69

Base Hydrolysis of Copolymer 13

Scheme 69

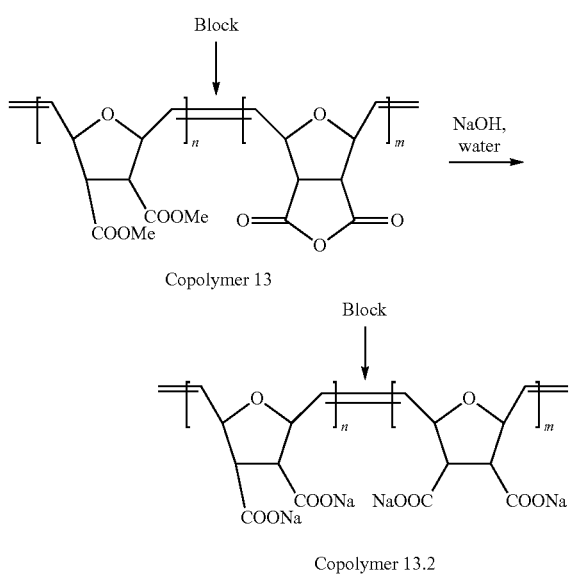

Copolymer 13

Copolymer 13.2

Procedure:

NaOH (0.065 g, 1.61·10$^{-3}$ mol) was dissolved in water (5 mL) and added to a flask containing solid Copolymer 13 (0.17 g, 8.09·10$^{-4}$ mol) and stirred 10 h. At the start the Copolymer 13 was floated on the surface, then formed a gel but eventually dissolved in the water as the reaction proceeded with time. The color of the solution during the reaction changed from colorless to greenish. Copolymer 13.2 was kept in the solution. Alternatively, Copolymer 13.2 can be precipitated in ethanol and dried under reduced pressure.

Example 70

Base Hydrolysis of Copolymer 14

Scheme 70

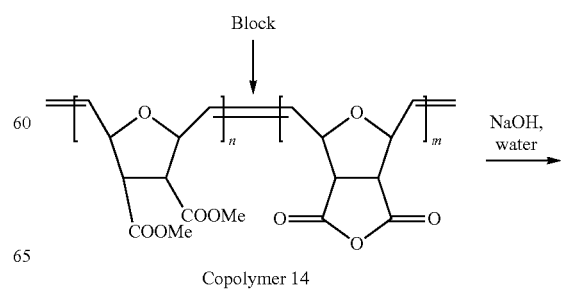

Copolymer 14

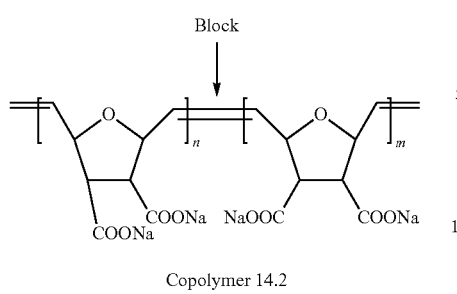

Copolymer 14.2

Procedure:

NaOH (0.065 g, 1.61·10$^{-4}$ mol) was dissolved in water (5 mL) and added to a flask containing solid Copolymer 14 (0.17 g, 8.09·10$^{-4}$ mol) and stirred 10 h. At the start the Copolymer 14 was floated on the surface, then formed a gel but eventually dissolved in the water as the reaction proceeded with time. The color of the solution during the reaction changed from colorless to greenish. Copolymer 14.2 was kept in the solution. Alternatively, Copolymer 14.2 can be precipitated in ethanol and dried under reduced pressure.

Example 71

Base Hydrolysis of Copolymer 15

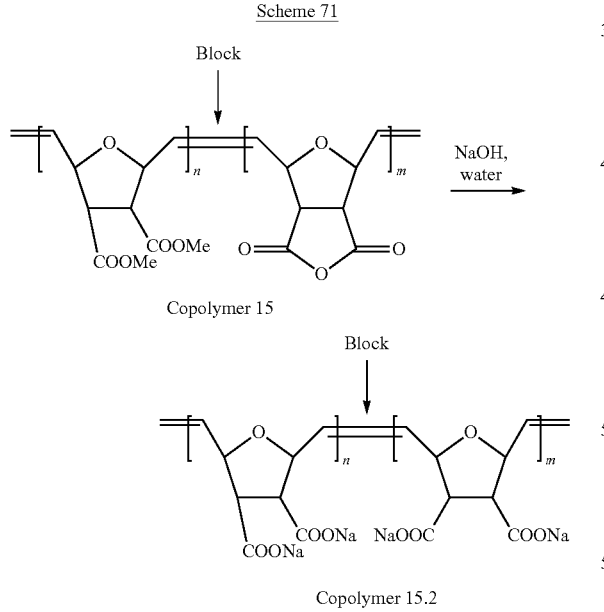

Procedure:

NaOH (0.065 g, 1.61·10$^{-3}$ mol) was dissolved in water (5 mL) and added to a flask containing solid Copolymer 15 (0.17 g, 8.09·10$^{-4}$ mol) and stirred 10 h. At the start the Copolymer 15 was floated on the surface, then formed a gel but eventually dissolved in the water as the reaction proceeded with time. The color of the solution during the reaction changed from colorless to greenish. Copolymer 15.2 was kept in the solution. Alternatively, Copolymer 15.2 can be precipitated in ethanol and dried under reduced pressure.

Example 72

Base Hydrolysis of Copolymer 17

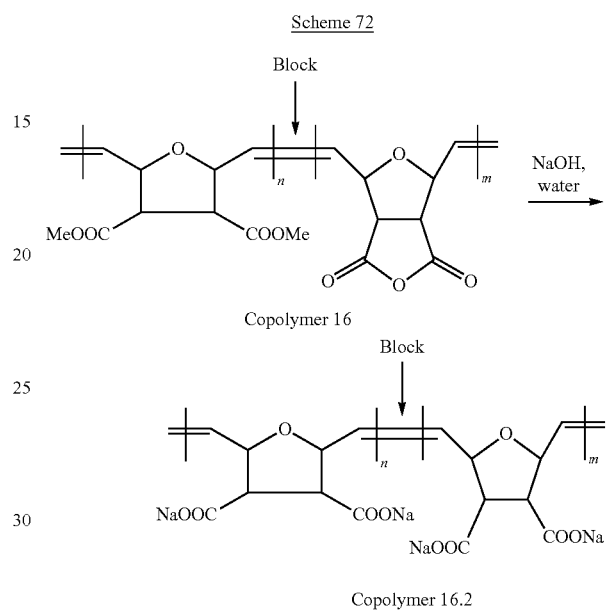

Procedure:

NaOH (0.065 g, 1.61·10$^{-3}$ mol) was dissolved in water (5 mL) and added to a flask containing solid Copolymer 16 (0.17 g, 8.09·10$^{-4}$ mol) and stirred 2 h. At the start the Copolymer 16 was floated on the surface but eventually dissolved in the water as the reaction proceeded with time. The color of the solution during the reaction changed from colorless to greenish. Copolymer 16.2 was kept in the solution. Alternatively, Copolymer 16.2 can be precipitated in ethanol and dried under reduced pressure.

Example 73

Base Hydrolysis of Copolymer 18

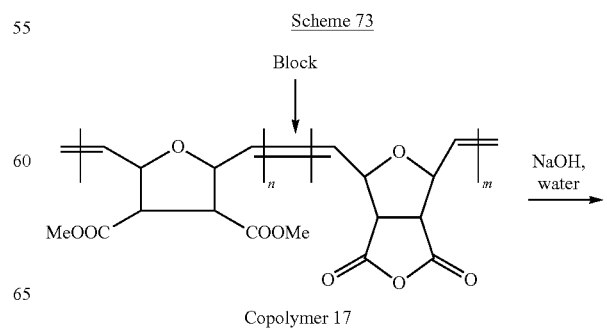

-continued

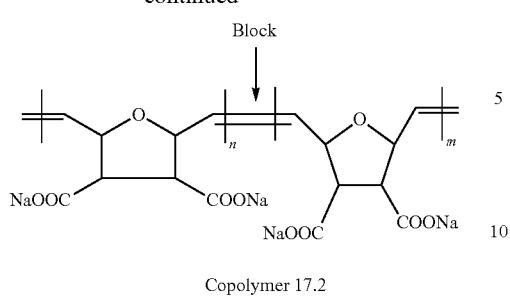

Copolymer 17.2

Procedure:

NaOH (0.065 g, 1.61·10⁻³ mol) was dissolved in water (5 mL) and added to a flask containing solid Copolymer 17 (0.17 g, 8.09·10⁻⁴ mol) and stirred 2 h. At the start the Copolymer 17 was floated on the surface but eventually dissolved in the water as the reaction proceeded with time. The color of the solution during the reaction changed from colorless to greenish. Copolymer 17.2 was kept in the solution. Alternatively, Copolymer 17.2 can be precipitated in ethanol and dried under reduced pressure.

Example 74

Base Hydrolysis of Copolymer 19

Scheme 74

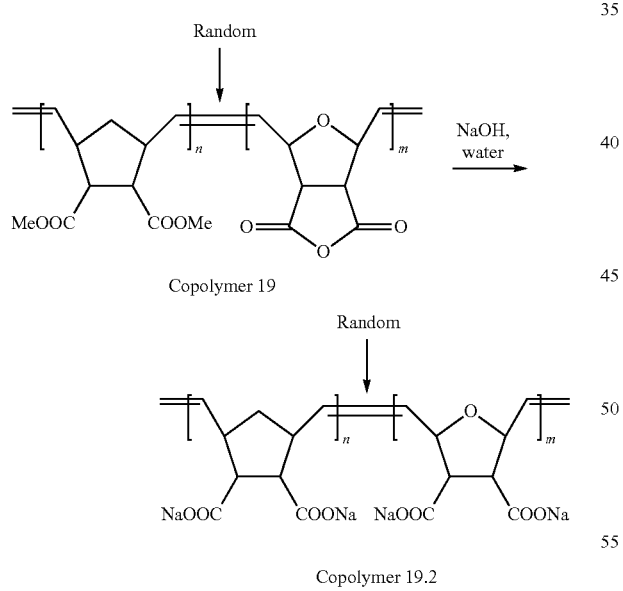

Copolymer 19.2

Procedure:

NaOH (0.065 g, 1.61·10⁻³ mol) was dissolved in water (5 mL) and added to a flask containing solid Copolymer 19 (0.17 g, 8.09·10⁻⁴ mol) and stirred 2 h. At the start the Copolymer 19 was floated on the surface but eventually dissolved in the water as the reaction proceeded with time. The color of the solution during the reaction changed from colorless to greenish. Copolymer 19.2 was kept in the solution. Alternatively, Copolymer 19.2 can be precipitated in ethanol and dried under reduced pressure.

Example 75

Base Hydrolysis of Copolymer 20

Scheme 75

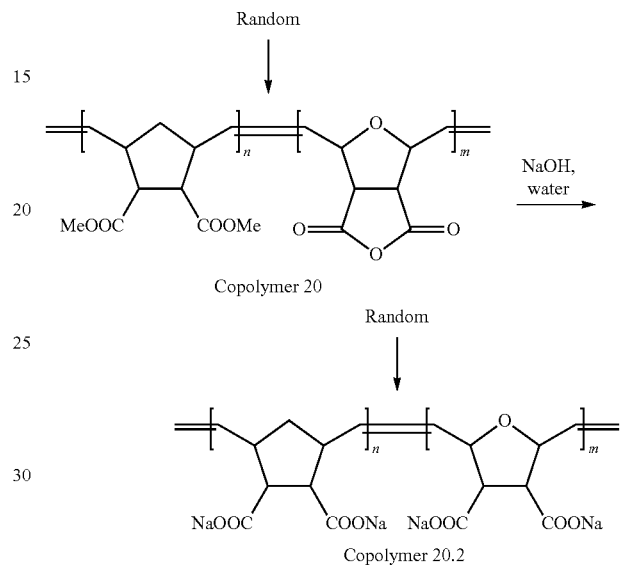

Copolymer 20.2

Procedure:

NaOH (0.065 g, 1.61·10⁻³ mol) was dissolved in water (5 mL) and added to a flask containing solid Copolymer 20 (0.17 g, 8.09·10⁻⁴ mol) and stirred 2 h. At the start the Copolymer 20 was floated on the surface but eventually dissolved in the water as the reaction proceeded with time. The color of the solution during the reaction changed from colorless to greenish. Copolymer 20.2 was kept in the solution. Alternatively, Copolymer 20.2 could be precipitated in ethanol and dried under reduced pressure.

Example 76

Base Hydrolysis of Copolymer 21

Scheme 76

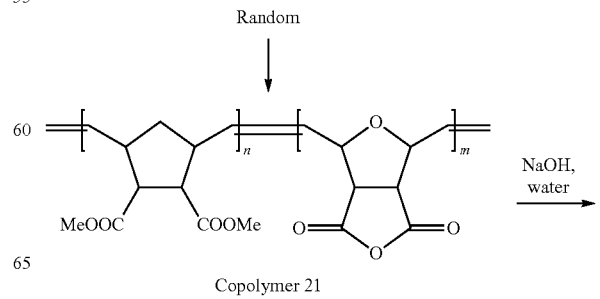

Copolymer 21

-continued

Random

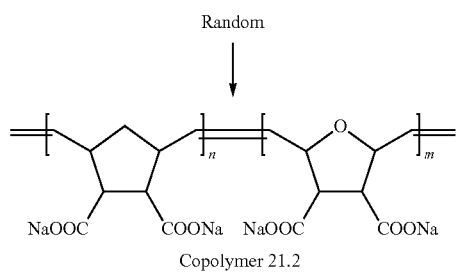

Copolymer 21.2

Procedure:

NaOH (0.065 g, $1.61 \cdot 10^{-3}$ mol) was dissolved in water (5 mL) and added to a flask containing solid Copolymer 21 (0.17 g, $8.09 \cdot 10^{-4}$ mol) and stirred 2 h. At the start the Copolymer 21 was floated on the surface but eventually dissolved in the water as the reaction proceeded with time. The color of the solution during the reaction changed from colorless to greenish. Copolymer 21.2 was kept in the solution. Alternatively, Copolymer 21.2 can be precipitated in ethanol and dried under reduced pressure (yield 98% after precipitation).

Example 77

Base Hydrolysis of Copolymer 22

Block

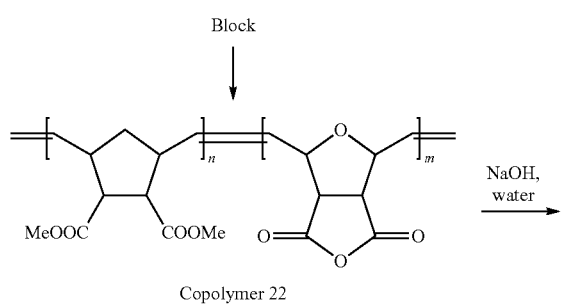

Copolymer 22

Block

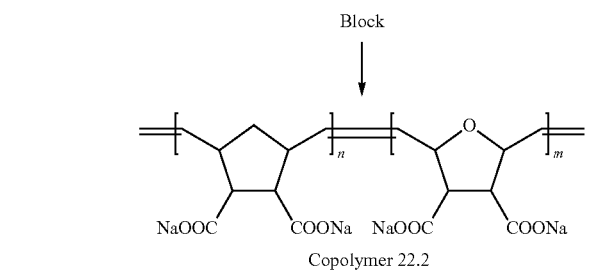

Copolymer 22.2

Procedure:

NaOH (0.065 g, $1.61 \cdot 10^{-3}$ mol) was dissolved in water (5 mL) and added to a flask containing solid Copolymer 22 (0.17 g, $8.09 \cdot 10^{-4}$ mol) and stirred 10 h. At the start the Copolymer 22 was floated on the surface, then formed a gel but eventually dissolved in the water as the reaction proceeded with time. The color of the solution during the reaction changed from colorless to greenish. Copolymer 22.1 was kept in the solution. Alternatively, Copolymer 22.1 can be precipitated in ethanol and dried under reduced pressure.

Example 78

Base Hydrolysis of Copolymer 23

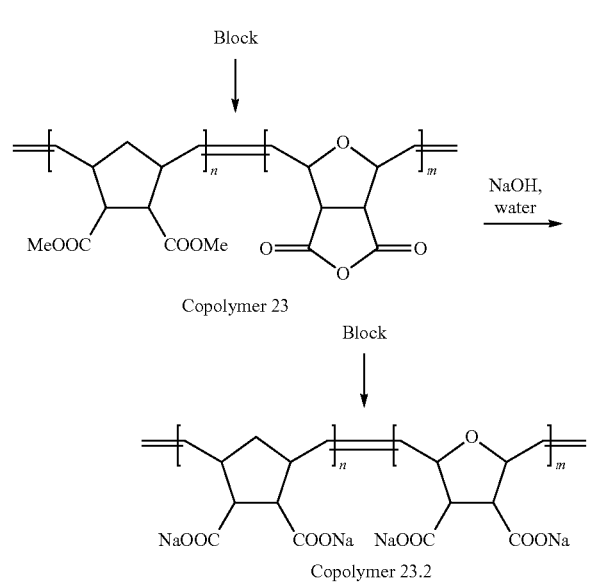

Copolymer 23.2

Procedure:

NaOH (0.065 g, $1.61 \cdot 10^{-3}$ mol) was dissolved in water (5 mL) and added to a flask containing solid Copolymer 23 (0.17 g, $8.09 \cdot 10^{-4}$ mol) and stirred 10 h. At the start the Copolymer 23 was floated on the surface, then formed a gel but eventually dissolved in the water as the reaction proceeded with time. The color of the solution during the reaction changed from colorless to greenish. Copolymer 23.2 was kept in the solution. Alternatively, Copolymer 23.2 can be precipitated in ethanol and dried under reduced pressure.

Example 79

Base Hydrolysis of Copolymer 24

Scheme 79

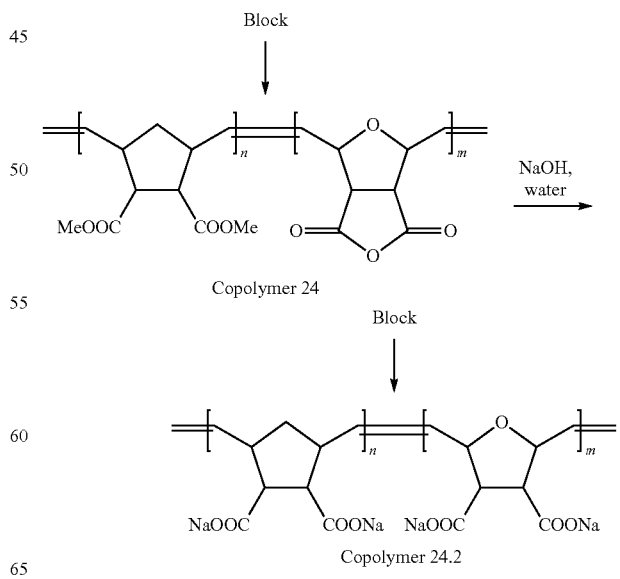

Copolymer 24.2

Procedure:

NaOH (0.065 g, 1.61·10⁻³ mol) was dissolved in water (5 mL) and added to a flask containing solid Copolymer 24 (0.17 g, 8.09·10⁻⁴ mol) and stirred 10 h. At the start the Copolymer 24 was floated on the surface, then formed a gel but eventually dissolved in the water as the reaction proceeded with time. The color of the solution during the reaction changed from colorless to greenish. Copolymer 24.2 was kept in the solution. Alternatively, Copolymer 24.2 can be precipitated in ethanol and dried under reduced pressure.

Example 89

Base Hydrolysis of Polymer 8

Scheme 80

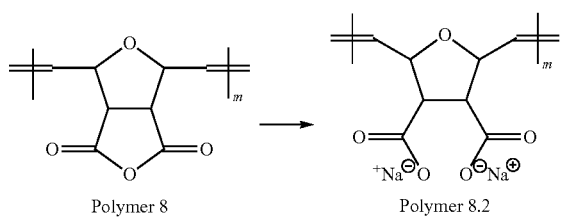

Polymer 8 → Polymer 8.2

Procedure:

NaOH (0.065 g, 1.61·10⁻³ mol) was dissolved in water (5 mL) and added to a flask containing solid Polymer 8 (0.17 g, 8.09·10⁻⁴ mol) and stirred 10 h. At the start the Polymer 8 was floated on the surface, then formed a gel but eventually dissolved in the water as the reaction proceeded with time. The color of the solution during the reaction changed from colorless to greenish. Polymer 8.2 was kept in the solution. Alternatively, Copolymer 8.2 can be precipitated in ethanol and dried under reduced pressure.

Example 81

Base Hydrolysis of Copolymer 25

Scheme 81

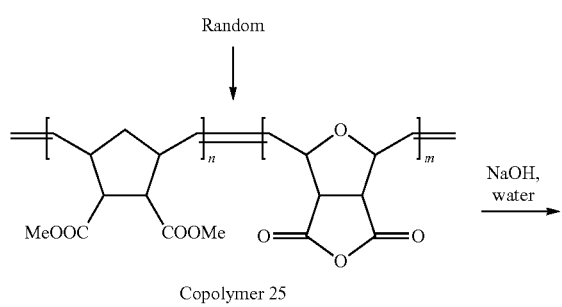

Copolymer 25

-continued

Random

Copolymer 25.2

Procedure:

NaOH (0.065 g, 1.61·10⁻³ mol) was dissolved in water (5 mL) and added to a flask containing solid Copolymer 25 (0.17 g, 8.09·10⁻⁴ mol) and stirred 2 h. At the start the Copolymer 25 was floated on the surface but eventually dissolved in the water as the reaction proceeded with time. The color of the solution during the reaction changed from colorless to greenish. Copolymer 25.2 was kept in the solution. Alternatively, Copolymer 25.2 can be precipitated in ethanol and dried under reduced pressure.

Example 82

Base Hydrolysis of Copolymer 26

Scheme 82

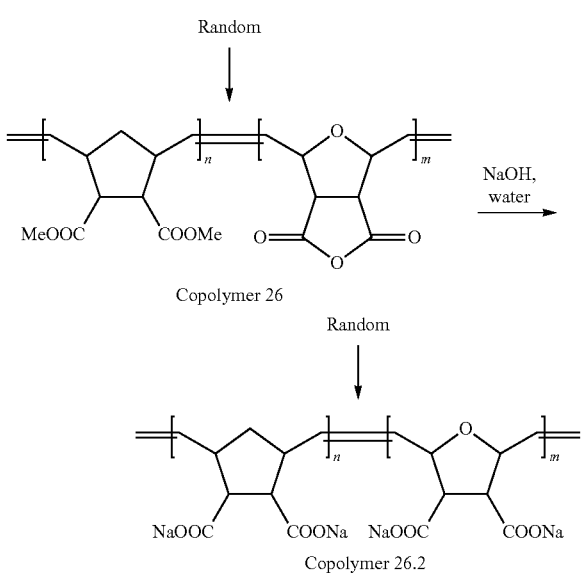

Procedure:

NaOH (0.065 g, 1.61·10⁻³ mol) was dissolved in water (5 mL) and added to a flask containing solid Copolymer 26 (0.17 g, 8.09·10⁻⁴ mol) and stirred 2 h. At the start the Copolymer 26 was floated on the surface but eventually dissolved in the water as the reaction proceeded with time. The color of the solution during the reaction changed from colorless to greenish. Copolymer 26.2 was kept in the solution. Alternatively, Copolymer 26.2 can be precipitated in ethanol and dried under reduced pressure.

Example 83

Base Hydrolysis of Copolymer 27

Scheme 83

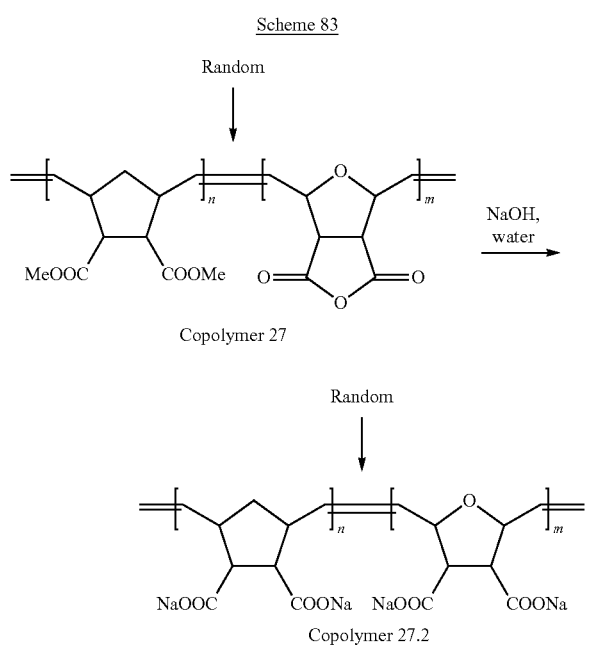

Procedure:

NaOH (0.065 g, $1.61 \cdot 10^{-3}$ mol) was dissolved in water (5 mL) and added to a flask containing solid Copolymer 27 (0.17 g, $8.09 \cdot 10^{-4}$ mol) and stirred 2 h. At the start the Copolymer 27 was floated on the surface but eventually dissolved in the water as the reaction proceeded with time. The color of the solution during the reaction changed from colorless to greenish. Copolymer 27.2 was kept in the solution. Alternatively, Copolymer 27.2 can be precipitated in ethanol and dried under reduced pressure (yield 98% after precipitation).

Example 84

Base Hydrolysis of Copolymer 29

Scheme 84

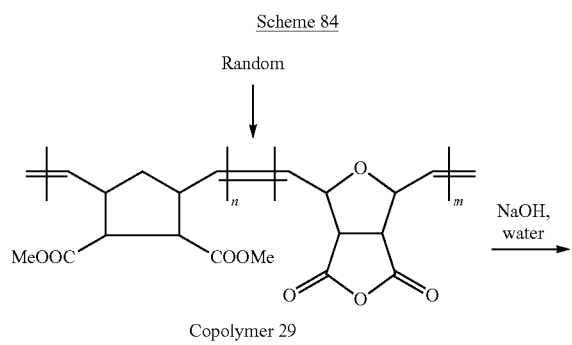

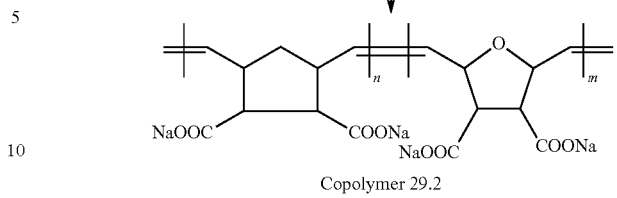

Copolymer 29.2

Procedure:

NaOH (0.065 g, $1.61 \cdot 10^{-3}$ mol) was dissolved in water (5 mL) and added to a flask containing solid Copolymer 29 (0.17 g, $8.09 \cdot 10^{-4}$ mol) and stirred 2 h. At the start the Copolymer 29 was floated on the surface but eventually dissolved in the water as the reaction proceeded with time. The color of the solution during the reaction changed from colorless to greenish. Copolymer 29.2 was kept in the solution. Alternatively, Copolymer 29.2 can be precipitated in ethanol and dried under reduced pressure (yield 98% after precipitation).

Example 85

Base Hydrolysis of Copolymer 2.1

Scheme 85

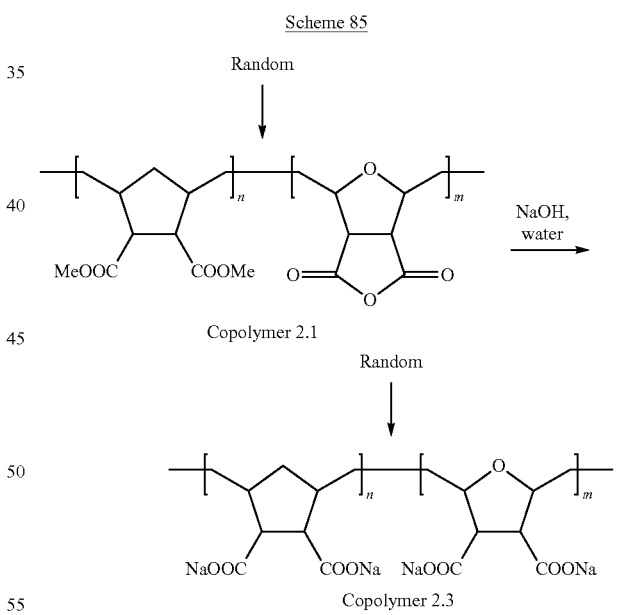

Procedure:

NaOH (0.065 g, $1.61 \cdot 10^{-3}$ mol) was dissolved in water (5 mL) and added to a flask containing solid Copolymer 2.1. (0.17 g, $8.09 \cdot 10^{-4}$ mol) and stirred 2 h. At the start the Copolymer 2.1 was floated on the surface but eventually dissolved in the water as the reaction proceeded with time. The color of the solution during the reaction changed from colorless to greenish. Copolymer 2.3 was kept in the solution. Alternatively, Copolymer 2.3 can be precipitated in ethanol and dried under reduced pressure.

Example 86

Base Hydrolysis of Copolymer 5.1

Scheme 86

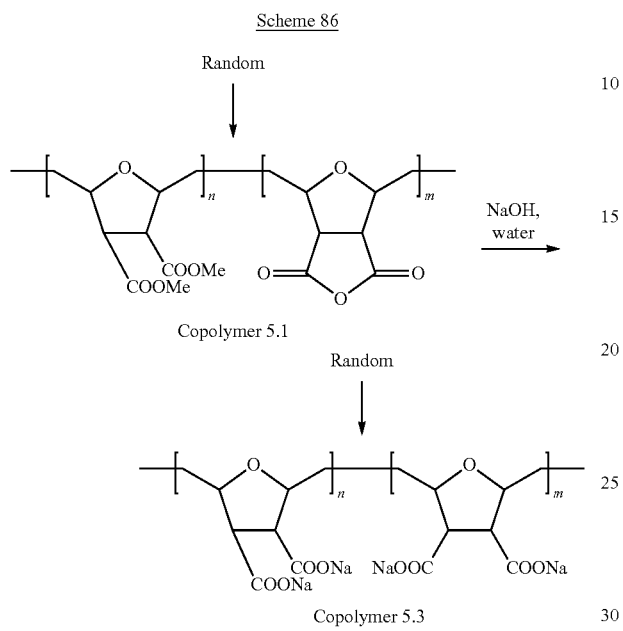

Copolymer 5.1

Copolymer 5.3

Procedure:

NaOH (0.065 g, 1.61·10$^{-3}$ mol) was dissolved in water (5 mL) and added to a flask containing solid Copolymer 5.1. (0.17 g, 8.09·10$^{-4}$ mol) and stirred 2 h. At the start the Copolymer 5.1 was floated on the surface but eventually dissolved in the water as the reaction proceeded with time. The color of the solution during the reaction changed from colorless to greenish. Copolymer 5.3 was kept in the solution. Alternatively, Copolymer 5.3 can be precipitated in ethanol and dried under reduced pressure.

Example 87

Base Hydrolysis of Copolymer 11.1

Scheme 87

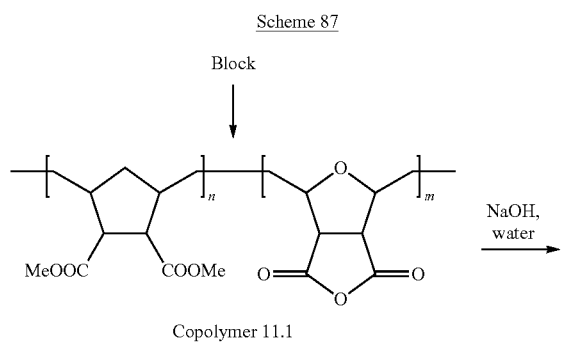

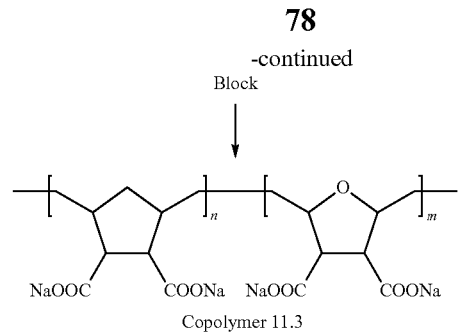

Copolymer 11.3

Procedure:

NaOH (0.065 g, 1.61·10$^{-3}$ mol) was dissolved in water (5 mL) and added to a flask containing solid Copolymer 11.1. (0.17 g, 8.09·10$^{-4}$ mol) and stirred 2 h. At the start the Copolymer 11.1 was floated on the surface but eventually dissolved in the water as the reaction proceeded with time. The color of the solution during the reaction changed from colorless to greenish. Copolymer 11.3 was kept in the solution. Alternatively, Copolymer 11.3 can be precipitated in ethanol and dried under reduced pressure.

Example 88

Base Hydrolysis of Copolymer 14.1

Scheme 88

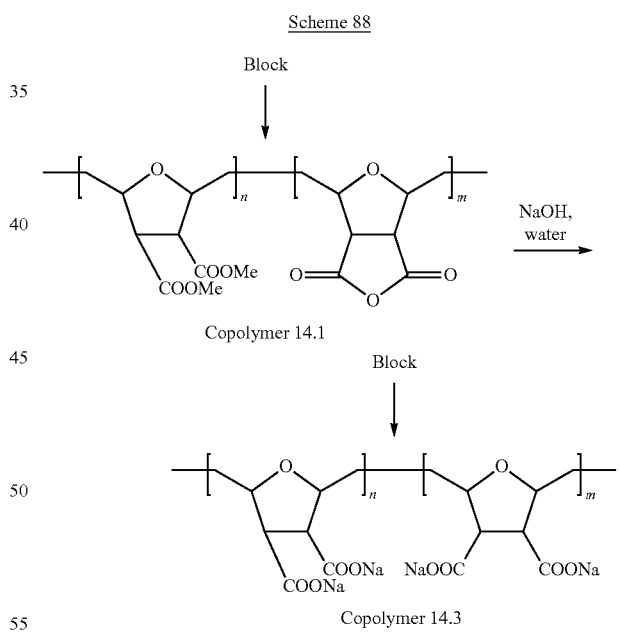

Procedure:

NaOH (0.065 g, 1.61·10$^{-3}$ mol) was dissolved in water (5 mL) and added to a flask containing solid Copolymer 14.1. (0.17 g, 8.09·10$^{-4}$ mol) and stirred 2 h. At the start the Copolymer 14.1 was floated on the surface but eventually dissolved in the water as the reaction proceeded with time. The color of the solution during the reaction changed from colorless to greenish. Copolymer 14.3 was kept in the solution. Alternatively, Copolymer 14.3 can be precipitated in ethanol and dried under reduced pressure.

Example 89

Base Hydrolysis of Polymer 7.1

Scheme 89

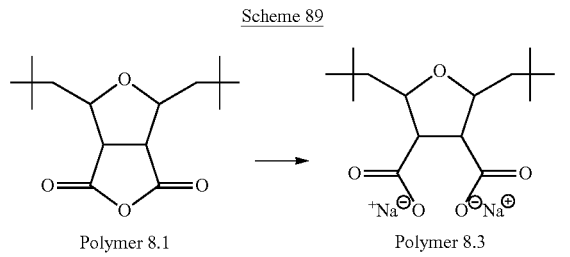

Polymer 8.1 → Polymer 8.3

Procedure:

NaOH (0.065 g, $1.61 \cdot 10^{-3}$ mol) was dissolved in water (5 mL) and added to a flask containing solid Polymer 8.1. (0.17 g, $8.09 \cdot 10^{-4}$ mol) and stirred 10 h. At the start the Polymer 8.1 was floated on the surface, then formed a gel but eventually dissolved in the water as the reaction proceeded with time. The color of the solution during the reaction changed from colorless to greenish. Polymer 8.3 was kept in the solution. However, Polymer 8.3 can be precipitated in ethanol and dried under reduced pressure.

While a number of embodiments of this invention have been represented, it is apparent that the basic construction can be altered to provide other embodiments that utilize the invention without departing from the spirit and scope of the invention. All such modifications and variations are intended to be included within the scope of the invention as defined in the appended claims rather than the specific embodiments that have been presented by way of example.

I claim:

1. A homopolymer, wherein the homopolymer is selected from the group of structures set out below:

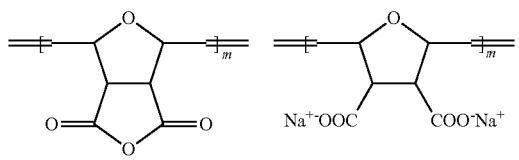

wherein m is an integer ranging from about 2 to about 10,000.

2. A non-homopolymer represented by the structure:

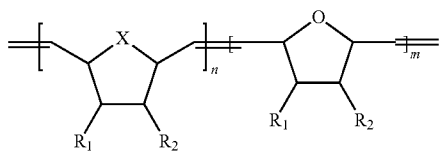

wherein X is selected from group consisting of $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; with the proviso that $R_1$ and $R_2$ are not both esters or are not both a carboxylic acid and a carboxylic ester, at the same time; and n and m are integers independently ranging from about 2 to about 10,000.

3. The non-homopolymer according to claim 2, wherein the non-homopolymer is selected from the group of structures set out below:

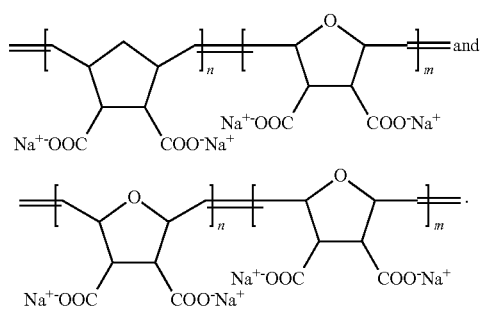

4. A composition comprising a non-homopolymer represented by the structure:

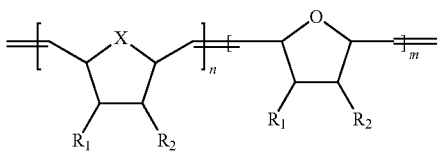

wherein X is a group selected from group consisting of $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; and n and m are integers independently ranging from about 2 to about 10,000.

5. The composition according to claim 4, wherein the non-homopolymer is selected from the group of structures set out below:

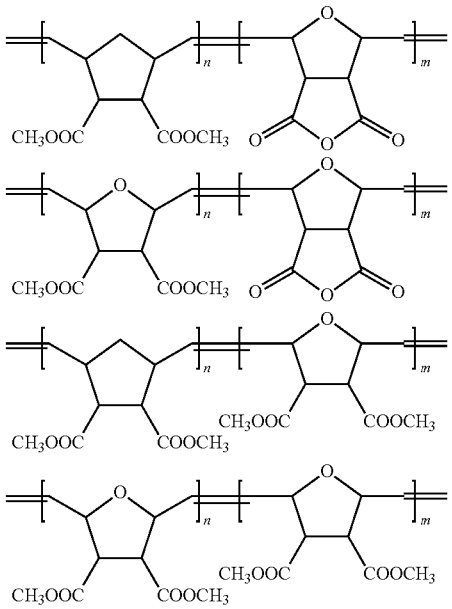

-continued

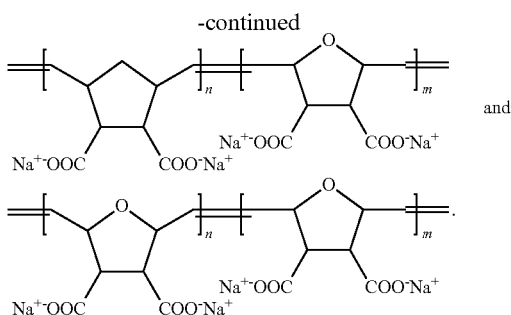

and

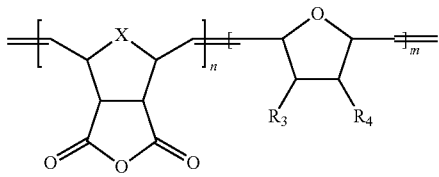

6. A non-homopolymer represented by the structure:

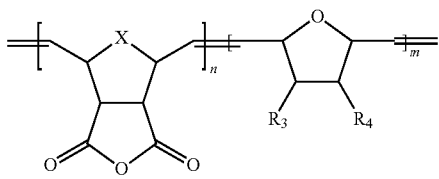

wherein X is selected from group consisting of $CH_2$ and O; $R_3$ and $R_4$ are independently selected from the group consisting of carboxylic acids, carboxylic acid salts, esters, and branched and unbranched alkyl groups, which may be with or without heteroatoms, and mixtures thereof; and n and m are integers independently ranging from about 2 to about 10,000.

7. A composition comprising a non-homopolymer represented by the structure:

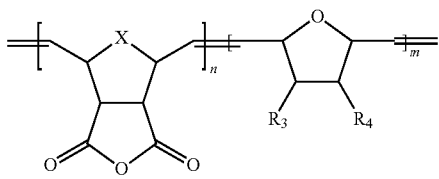

wherein X is selected from group consisting of $CH_2$ and O; $R_3$ and $R_4$ are independently selected from the group consisting of carboxylic acids, carboxylic acid salts, esters, and branched and unbranched alkyl groups, which may be with or without heteroatoms, and mixtures thereof; and n and m are integers independently ranging from about 2 to about 10,000.

8. A hydrogenated homopolymer, wherein the homopolymer is represented by the structure:

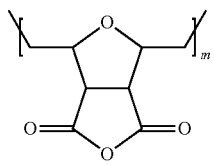

wherein m is an integer ranging from about 2 to about 10,000.

9. A composition comprising a hydrogenated homopolymer represented by the structure:

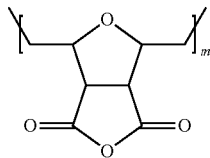

wherein m is an integer ranging from about 2 to about 10,000.

10. A hydrogenated non-homopolymer resulting from ring-opening metathesis polymerization of a norbornene dicarboxylic anhydride or oxanorbornene dicarboxylic anhydride moiety with a co-monomer moiety, wherein the non-homopolymer may be blocked or random, and the ratio of blocked or random norbornene dicarboxylic anhydride or oxanorbornene dicarboxylic anhydride moiety to co-monomer moiety is from about 99:1 to about 1:99, respectively, by molar proportions.

11. A hydrogenated non-homopolymer represented by the structure:

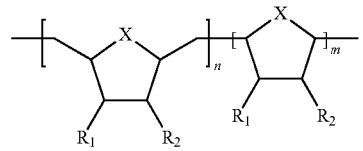

wherein X is a group independently selected from $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; and n and m are integers independently ranging from about 2 to about 10,000.

12. The hydrogenated non-homopolymer according to claim 11, wherein the non-homopolymer is selected from the group of structures set out below:

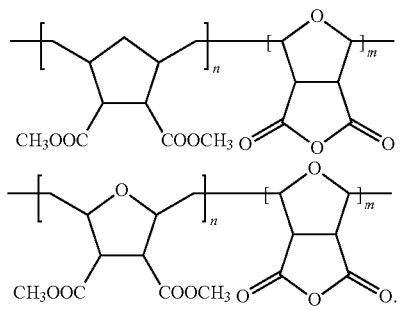

13. A composition comprising a hydrogenated non-homopolymer resulting from ring-opening metathesis polymerization of a norbornene dicarboxylic anhydride or oxanorbornene dicarboxylic anhydride moiety with a co-monomer moiety, wherein the non-homopolymer may be blocked or random, and the ratio of blocked or random norbornene dicarboxylic anhydride or oxanorbornene dicarboxylic anhydride moiety to co-monomer moiety is from about 99:1 to about 1:99, respectively, by molar proportions.

14. The composition according to claim 13, wherein the composition is an adhesive, coating, encapsulation, personal care, oilfield, membrane, agricultural, or cleaning composition.

15. A composition comprising a hydrogenated non-homopolymer represented by the structure:

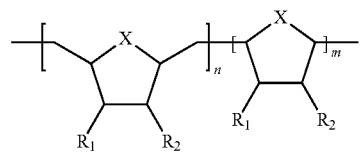

wherein X is a group independently selected from $CH_2$ and O; $R_1$ and $R_2$ are each independently selected from the group consisting of carboxylic acids, carboxylic acid salts, esters, and wherein $R_1$ and $R_2$ may be bonded together to form an anhydride ring moiety, and mixtures thereof; and n and m are integers independently ranging from about 2 to about 10,000.

16. The composition according to claim 15, wherein the hydrogenated non-homopolymer is selected from the group of structures set out below:
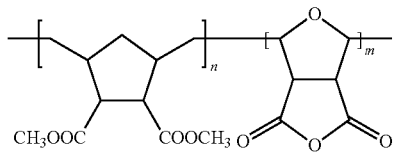
-continued
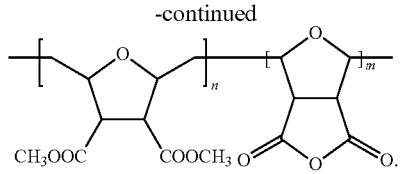
* * * * *